United States Patent [19]

Chaback et al.

[11] Patent Number: 5,439,054
[45] Date of Patent: Aug. 8, 1995

[54] METHOD FOR TREATING A MIXTURE OF GASEOUS FLUIDS WITHIN A SOLID CARBONACEOUS SUBTERRANEAN FORMATION

[75] Inventors: Joseph J. Chaback; Dan Yee, both of Tulsa, Okla.; Richard F. Volz, Jr., Littleton, Colo.; John P. Seidle, Tulsa, Okla.; Rajen Puri, Aurora, Colo.

[73] Assignee: Amoco Corporation, Chicago, Ill.

[21] Appl. No.: 222,743

[22] Filed: Apr. 1, 1994

[51] Int. Cl.[6] .............. E21B 43/16; E21B 43/40; E21B 47/00
[52] U.S. Cl. .................. 166/252; 166/266; 166/268; 166/305.1
[58] Field of Search ............... 166/252, 253, 266, 267, 166/268, 305.1; 405/52, 53, 54, 128; 588/250

[56] References Cited

U.S. PATENT DOCUMENTS

| | | | |
|---|---|---|---|
| 4,043,395 | 8/1977 | Every et al. | 166/263 |
| 4,283,089 | 8/1981 | Mazza et al. | 299/16 |
| 4,400,034 | 8/1983 | Chew | 299/5 |
| 4,446,921 | 5/1984 | Coenen et al. | 166/267 |
| 4,544,037 | 10/1985 | Terry | 166/369 |
| 4,756,367 | 7/1988 | Puri et al. | 166/263 |
| 4,883,122 | 11/1989 | Puri et al. | 166/263 |
| 5,014,785 | 5/1991 | Puri et al. | 166/263 |
| 5,014,788 | 5/1991 | Puri et al. | 166/308 |
| 5,085,274 | 2/1992 | Puri et al. | 166/252 |
| 5,099,921 | 3/1992 | Puri et al. | 166/266 |
| 5,133,406 | 7/1992 | Puri | 166/266 |
| 5,147,111 | 9/1992 | Montgomery | 299/16 |
| 5,332,036 | 7/1994 | Shirley et al. | 166/268 |

FOREIGN PATENT DOCUMENTS 609917 6/1978 U.S.S.R.

OTHER PUBLICATIONS

Letter of Nov. 22, 1993 from the State of New Mexico Energy, Minerals and Natural Resources Department to Amoco Production Company, Re: "Injection Pressure Increase Florence 'S' Gas Com No. 7-A, San Juan County, N. Mex".

Letter of Oct. 21, 1993 from Amoco Production Company to the New Mexico Oil Conservation Division, Re: "Basin Fruitland Carbon Dioxide Pilot Project Increased Surface Injection Pressure Limited Rule 6 and 7, Order No. R-9948 Florence 'S' Gas Com Well No. 7A N/2 Section 23, T30N-R9W San Juan County, N. Mex.".

State of New Mexico Energy, Minerals, and Natural Resources Department Oil Conservation Division, Order No. R-9948, Re: "Application of Amoco Production Company for a $CO_2$ Injection Pilot Project and an Exception to Rule No. (4), Order No. R-8768, As Amended, San Juan County, N. Mex.", (Aug. 30, 1993).

Amoco Production Company NMOCD Hearing Apr. 8, 1993, Case No. 10707, Exhibit No. 1-A.

(List continued on next page.)

Primary Examiner—George A. Suchfield
Attorney, Agent, or Firm—Charles P. Wakefield; Richard A. Kretchmer

[57] ABSTRACT

A method for treating a mixture of gaseous fluids within a solid carbonaceous subterranean formation. In some embodiments, the invention provides for the disposal of a strongly adsorbing gaseous fluid within the formation. In other embodiments, the invention provides a means for fractionating a mixture of gaseous fluids within the formation. In still other embodiments, the invention provides for the recovery of a raffinate from the formation which is enriched in relatively weaker adsorbing gaseous fluids. In still other embodiments, the invention provides for the recovery of methane from the formation.

27 Claims, 9 Drawing Sheets

OTHER PUBLICATIONS

Letter of May 3, 1993 from Campbell, Carr, Berge and Sheridan, P. A. to the Oil Conservation Division, New Mexico Department of Energy, Minerals and Natural Resources, Re: "Oil Conservation Division Case 10707: Application of Amoco Production Company for a CO2 Injection Pilot Project and an Exception to Rule 4, Order No. R-8768-A, San Juan County, N. Mex.".

Letter of Mar. 15, 1993 from J. W. Hawkins, Amoco Production Company, to the New Mexico Oil Conservation Division, File: CAW-059-986.511, Re: "Application for Hearing Approval of CO2 Injection Pilot Project and Exception to Rule 4, Order No. R-8768-A for Second Well on 320 Acre Spacing Unit W/2 Section-23, T30N-R9W Basin Fruitland Coal Gas Pool, San Juan County, N. Mex.".

M. G. Zagetakis, et al., "Methane Control in United States Coal Mines—1972", U.S. Bureau of Mines, Information Circular 8600, pp. 8-16, (1973).

R. S. Metcalfe, D. Yee, J. P. Seidle, and R. Puri, "Review of Research Efforts in Coalbed Methane Recovery", SPE 23025, (1991).

R. M. Rotty, "A Perspective on The Greenhouse Effect and $CO_2$ Flue Gas Recovery for EOR", U.S. Department of Energy & Argonne National Lab Recovery and Use of Waste $CO_2$ in Enhanced Oil Recovery Workshop, proceedings pp. 39-57, (Jun. 1988).

Alan A. Reznik, Pramod K. Singh and William L. Foley, "An Analysis of the Effect of Carbon Dioxide Injection on the Recovery of In-Situ Methane from Bituminous Coal: An Experimental Simulation", SPE/DOE 10822, (1982).

R. T. Ellington, et al., "Scrubbing $CO_2$ from Plant Exhausts Provides Economic Sources of Gas for EOR Projects", *Oil & Gas Journal*, pp. 112-114, 119-120, 124, (Oct. 15, 1984).

George P. Stoeppelwerth, "Exhaust Gas Provides Alternative Gas Source for Cyclic EOR", *Oil & Gas Journal*, pp. 68-69, (Apr. 26, 1993).

"Amoco CO2 Pilot Seeks to Increase Coalbed Gas Flow", *Oil & Gas Journal*, p. 33, (Dec. 27, 1993).

A. V. Astakov and D. L. Shirochin, "Capillary-Like Condensation of Sorbed Gases in Coals", *Fuel*, vol. 70, pp. 51-56, (Jan. 1991).

B. D. Hughes and T. L. Logan, "How to Design a Coalbed Methane Well", *Petroleum Engineer International*, pp. 16-20, (May 1990).

Anthony E. DeGance, "Multicomponent High-Pressure Adsorption Equilibria on Carbon Substates: Theory and Data", *Fluid Phase Equilibria*, vol. 78, pp. 99-137, Elsevier Science Publishers B. V., Amsterdam, (1992).

S. Harpalani and U. M. Pariti, "Study of Coal Sorption Isotherms Using a Multicomponent Gas Mixture", a paper presented at the 1993 International Coalbed Methane Symposium, Univeristy of Alabama/Tuscaloosa, (May 17-21, 1993).

R. S. Park, "Description of a North Sea $CO_2$ Enhanced Oil Recovery Project", U.S. Department of Energy & Argonne National Lab Recovery & Use of Waste $CO_2$ in Enhanced Oil Recovery Workshop, proceedings pp. 11-20, (Jun. 1988).

R. Puri and D. Yee, "Enhanced Coalbed Methane Recovery", SPE 20732, (1990).

Edwin P. Hyde, "Recovery of $CO_2$ from Flue Gas", a paper presented at the Gas Processors Assoc., Permian Basin Chapter, Regional Meeting, (May 5, 1983).

Paul F. Fulton, "A Laboratory Investigation of Enhanced Recovery of Methane from Coal by Carbon Dioxide Injection", SPE/DOE 8930, (1980).

Alan A. Reznik, et al., "Enhanced Recovery of In-Situ Methane by Carbon-Dioxide Injection: An Experimental Feasbility Study", a report by the Chemical and Petroleum Engineering Department, University of Pittsburgh, for the U.S. Department of Energy, Office of Fossil Energy, Morgantown Energy Technology Center, DOE/MC/14262-1732 (DE85003352), (May 1982).

Dan Yee, et al., "Gas Sorption on Coal and Measurement of Gas Content", *Hydrocarbons from Coal*, Chap. 9, pp. 203-218, The American Assoc. of Petroleum Geologists, Tulsa, Okla., (1993).

L. E. Arri, et al., "Modeling Coalbed Methane Production with Binary Gas Sorption", SPE 24363, (1992).

D. S. Arnold, et al., "$CO_2$ Can Be Produced from Flue Gas", *Oil and Gas Journal*, pp. 130-136, (Nov. 22, 1982).

N. Ali, et al., "Injection Above-Parting-Pressure Waterflood Pilor, Valhall Field, Norway", SPE 22893, (1991).

Carl L. Schuster, "Detection Within the Wellbore of (List continued on next page.)

OTHER PUBLICATIONS

Seismic Signals Created by Hydraulic Fracturing", SPE 7448, (1978).

Donald H. White, Jr. and P. Glenn Barkley, "The Design of Pressure Swing Adsorption Systems", *Chemical Engineering Progress*, pp. 25–33, (Jan. 1989).

Mark W. Ackley and Ralph T. Yang, "Kinetic Separation by Pressure Swing Adsorption: Method of Charactistics Model", *AIChE Journal*, vol. 36, No. 8, pp. 1229–1238, (1990).

Douglas. M. Ruthvan, "Principles of Adsorption and Adsorption Processes", A Wiley-Interscience Publication, John Wiley & Sons, pp. 359–375, (1984).

H. S. Shin and K. S. Knaebel, "Pressure Swing Absorption: An Experimental Study of Diffusion–Induced Separation", *AIChE Journal*, vol. 34, No. 9, pp. 1409–1416, (1988).

S. Farooq and D. M. Ruthven, "Effect of Equilibrium Selectivety in a Kinetically Controlled PSA Separation", *Chemical Engineering Science*, vol. 47, No. 8, pp. 2093–2094, (1992).

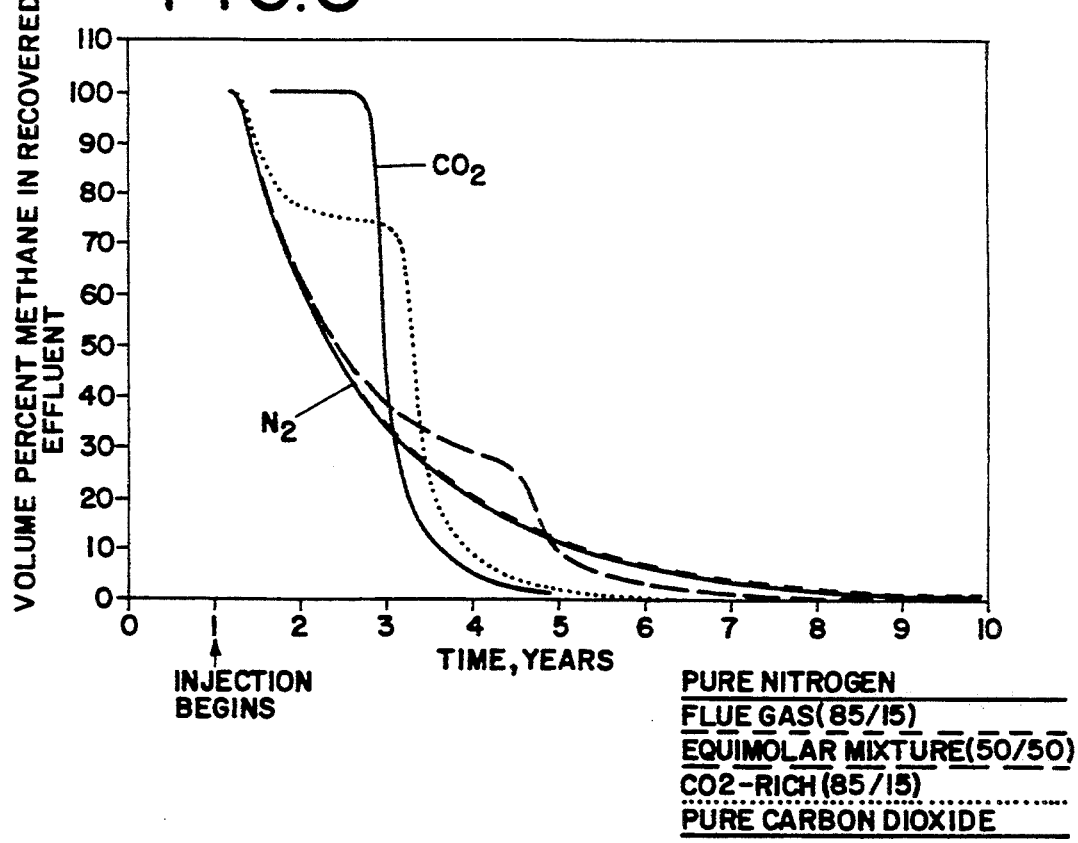
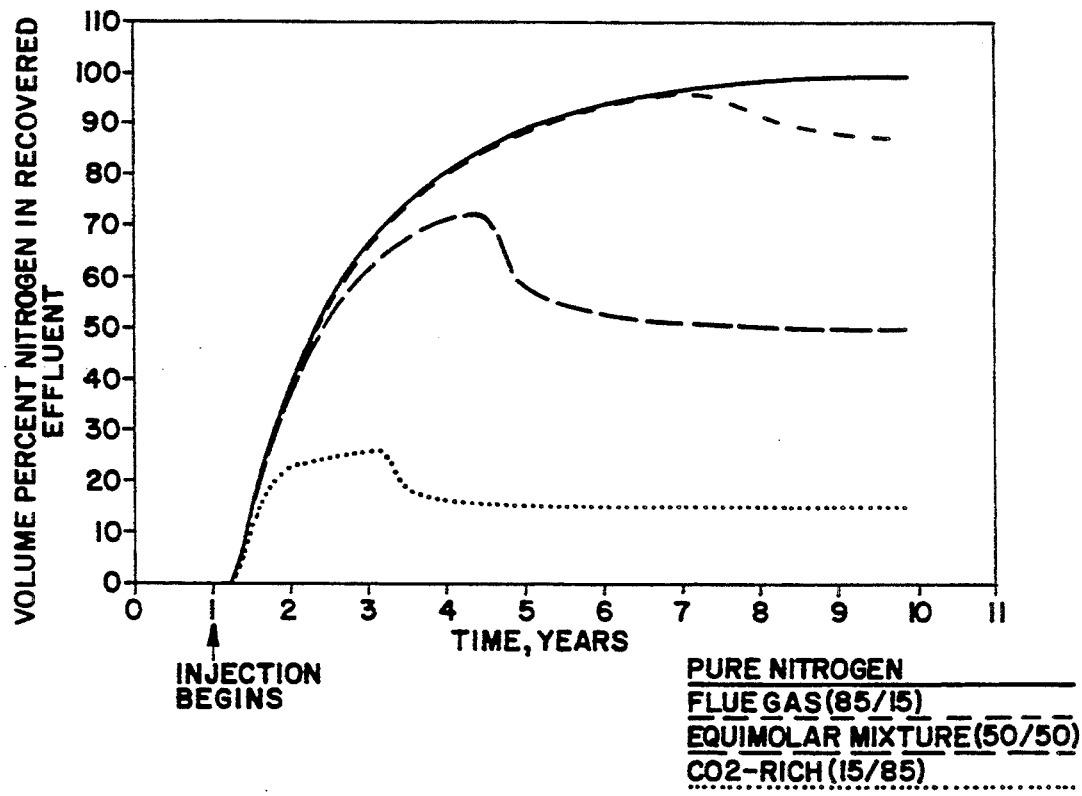

INJECTION OF
15% CO$_2$/85% N$_2$
BEGINS

INJECTION OF
15% CO$_2$/85% N$_2$
BEGINS

GASEOUS FLUID CONTAINING 100% CO₂ UTILIZED
GASEOUS FLUID CONTAINING 70% CO₂/30% CH₄ UTILIZED

GASEOUS FLUID CONTAINING 100% CO₂ UTILIZED
GASEOUS FLUID CONTAINING 70% CO₂/30% CH₄ UTILIZED

GASEOUS FLUID CONTAINING 100% CO$_2$ UTILIZED
GASEOUS FLUID CONTAINING 70% CO$_2$/30% CH$_4$ UTILIZED

GASEOUS FLUID CONTAINING 100% CO$_2$ UTILIZED
GASEOUS FLUID CONTAINING 70% CO$_2$/30% CH$_4$ UTILIZED

GASEOUS FLUID CONTAINING 100% CO₂ UTILIZED
GASEOUS FLUID CONTAINING 70% CO₂/30% CH₄ UTILIZED

GASEOUS FLUID CONTAINING 100% CO₂ UTILIZED
GASEOUS FLUID CONTAINING 70% CO₂/30% CH₄ UTILIZED

GASEOUS FLUID CONTAINING 100% $CO_2$ UTILIZED
GASEOUS FLUID CONTAINING 70% $CO_2$/30% $CH_4$ UTILIZED

GASEOUS FLUID CONTAINING 100% $CO_2$ UTILIZED
GASEOUS FLUID CONTAINING 70% $CO_2$/30% $CH_4$ UTILIZED

METHOD FOR TREATING A MIXTURE OF GASEOUS FLUIDS WITHIN A SOLID CARBONACEOUS SUBTERRANEAN FORMATION

FIELD OF THE INVENTION

The present invention relates to methods which utilize a solid carbonaceous subterranean formation's ability to preferentially sorb gases to fractionate a mixture of gaseous fluids within the formation and to dispose of strongly adsorbing gases within the formation.

BACKGROUND OF THE INVENTION

Numerous industrial processes discharge streams which comprise a mixture of various gaseous fluids. There is increasing concern that some of the constituents of the effluent streams may cause significant environmental problems, and that these streams therefore should not be released into the atmosphere. Carbon dioxide is a compound which is a constituent of many of the effluent streams released from industrial processes and whose release into the atmosphere is causing increasing concern.

It is hypothesized that carbon dioxide released into the atmosphere acts as a green-house gas and that too high a concentration of green-house gases in the atmosphere will cause global warming. In response to this potential threat, many governmental bodies have either enacted or plan to enact regulations limiting the quantity of carbon dioxide which can be released into the atmosphere. These regulations can hamper many industries because the combustion of virtually any hydrocarbon fuel with air produces an effluent containing carbon dioxide, nitrogen, and other gaseous combustion products.

The mixture of gases which results from the combustion of a hydrocarbon with oxygen or air is hereinafter referred to as "flue gas." The chemical composition of flue gas depends on many variables, including but not limited to, the combusted hydrocarbon, the combustion process oxygen-to-fuel ratio, and the combustion temperature. In addition to carbon dioxide and nitrogen, flue gas may contain compounds such as hydrogen sulfide, carbon monoxide, sulfur oxides, nitrogen oxides, and other constituents. The release of these compounds to the atmosphere also is coming under increasing public scrutiny and is the subject of increasing governmental regulation.

In addition to being a hydrocarbon combustion product, carbon dioxide can be produced by natural processes and released to the environment during a non-combustion process. For example, carbon dioxide is produced by the thermal and biogenic processes which are believed to form hydrocarbons such as oil, natural gas, or coal. Carbon dioxide often is recovered with these hydrocarbons and released to the atmosphere by various post-production steps. An example of such a process is cryogenic separation, which utilizes cryogenic cooling and compression to separate non-hydrocarbon fluids, such as carbon dioxide, from a natural gas production stream.

The increasing concern over the atmospheric release of carbon dioxide and other compounds demands methods by which to dispose of the compounds. Because the waste compounds often are a constituent of a volumetrically larger effluent stream, it is preferred that the disposal methods somehow utilize the larger effluent streams to enhance the efficiency of the overall process and/or to facilitate the recovery of a valuable product using the process in addition to providing for the disposal of carbon dioxide contained therein.

As used herein, the following terms shall have the following meanings:

(a) "cleats" or "cleat system" is the natural system of fractures within a solid carbonaceous subterranean formation;

(b) a "coalbed" comprises one or more coal seams in fluid communication with each other;

(c) "desorbing fluid" includes any fluid or mixture of fluids which is capable of causing methane to desorb from a solid carbonaceous subterranean formation;

(d) "formation parting pressure" and "parting pressure" mean the pressure needed to open a formation and propagate an induced fracture through the formation;

(e) "fracture half-length" is the distance, measured along the fracture, from the wellbore to the fracture tip;

(f) "recovering" means a controlled collection and/or disposition of a fluid, such as storing the fluid in a tank or distributing the fluid through a pipeline. "Recovering" specifically excludes venting the fluid into the atmosphere;

(g) "reservoir pressure" means the pressure of a productive formation near a well during shut-in of that well. The reservoir pressure can vary throughout the formation. Also, the reservoir pressure of the formation may change over time as desorbing fluid is injected into the formation and fluids are produced from the formation;

(h) "solid carbonaceous subterranean formation" refers to any substantially solid carbonaceous, methane-containing material located below the surface of the earth. It is believed that these methane-containing materials are produced by the thermal and biogenic degradation of organic matter. Solid carbonaceous subterranean formations include but are not limited to coalbeds and other carbonaceous formations such as antrium, carbonaceous, and devonian shales;

(i) "well spacing" or "spacing" is the straight-line distance between the individual wellbores of a production well and an injection well. The distance is measured from where the wellbores intercept the formation of interest;

(j) "preferentially sorbing", "preferentially sorbs", and "preferential sorption" refer to processes which occur within a solid carbonaceous subterranean formation that alter the relative proportions of the components of a gaseous fluid. These processes may fractionate a mixture of gaseous fluids by equilibrium separation, kinetic separation, steric separation, and/or any other physical or chemical processes or combination of processes which within a solid carbonaceous subterranean formation will selectively fractionate a mixture of gaseous fluids;

(k) "raffinate" refers to that portion of a mixture of gaseous fluids injected into a solid carbonaceous subterranean formation which is not preferentially sorbed by the formation; and (l) "adsorbate" is that portion of a mixture of gaseous fluids which is preferentially adsorbed by a carbonaceous matrix of the solid carbonaceous subterranean formation and which is recovered from the formation when the total pressure within the formation is reduced.

SUMMARY OF THE INVENTION

One object of this invention is to provide a method for fractionating a mixture of gaseous fluids within a solid carbonaceous subterranean formation.

Another object of the invention is to provide a method for disposing of a strongly adsorbing fluid within a solid carbonaceous subterranean formation.

Yet another object of the invention is to provide a method for disposing of carbon dioxide within a solid carbonaceous subterranean formation.

Still another object of the invention is to provide a method for disposing of carbon dioxide within a solid carbonaceous subterranean formation while simultaneously recovering methane from the formation.

Another object of the invention is to provide a method for fractionating a mixture of gaseous fluids containing relatively stronger adsorbing fluids and relatively weaker adsorbing fluids within a solid carbonaceous subterranean formation, and for recovering a gaseous effluent enriched in relatively weaker adsorbing fluids from the formation.

Another further object of the invention is to utilize the recovered gaseous effluent enriched in relatively weaker adsorbing fluids to enhance the recovery of methane from a solid carbonaceous subterranean formation.

The above objects of the invention are satisfied by the following aspects of the invention:

The first aspect of the invention is a method for fractionating a mixture of gaseous fluids within a coal seam, the method comprising the steps of:
a) introducing a mixture of gaseous fluids comprising a weaker adsorbing fluid component and a stronger adsorbing fluid component into the coal seam: and
b) recovering a raffinate, enriched in the weaker adsorbing fluid component, from the coal seam.

In a second aspect of the invention, a method is disclosed for recovering methane from a solid carbonaceous subterranean formation penetrated by an injection well and a production well, the method comprising the steps of:
a) injecting a desorbing fluid having a volume percentage of carbon dioxide equal to A into the solid carbonaceous subterranean formation through the injection well;
b) recovering an effluent comprising methane from the production well;
c) monitoring the composition of the effluent produced in step b); and
d) ceasing recovery of the effluent produced in step b) when a volume percentage of carbon dioxide in the effluent recovered in step b) is greater than 0.5 A.

In a third aspect of the invention is, a method is disclosed for recovering methane from a solid carbonaceous subterranean formation penetrated by an injection well and a production well, the method comprising the steps of:
a) injecting a desorbing fluid, having a volume ratio of carbon dioxide to other injected desorbing fluid components equal to B, into the solid carbonaceous subterranean formation through the injection well;
b) recovering an effluent comprising injected desorbing fluid and methane from the production well;
c) monitoring the volume ratio of the carbon dioxide to other injected desorbing fluid components contained in the effluent recovered at the production well; and
d) ceasing recovery of the effluent from the production well when the volume ratio of carbon dioxide to other injected desorbing fluid components within the effluent recovered at the production well is greater than 0.5 B and at least 70 percent of the methane available to the production well has been recovered.

In a fourth aspect of the invention, a method is disclosed for disposing carbon dioxide within a solid carbonaceous subterranean formation, the method comprising the steps of:
a) injecting a desorbing fluid, having a volume ratio of carbon dioxide to other injected desorbing fluid components equal to B, into the solid carbonaceous subterranean formation;
b) withdrawing a gaseous effluent having a volume ratio of carbon dioxide to other desorbing fluids of less than B from the formation; and
c) ceasing to withdraw the gaseous effluent from the formation when a volume ratio of carbon dioxide to other injected desorbing fluid components within the gaseous effluent withdrawn in step b) is greater than 0.5 B.

In a fifth aspect of the invention, a method is disclosed for recovering methane from a solid carbonaceous subterranean formation penetrated by an injection well and a production well, the method comprising the steps of:
a) injecting a desorbing fluid having a volume percentage of carbon dioxide equal to A into the solid carbonaceous subterranean formation through the injection well; and
b) recovering an effluent having a volume percentage of carbon dioxide less than A from the production well.

In some of embodiments, the invention provides a means for disposing of large quantities of an unwanted gaseous fluid within a solid carbonaceous subterranean formation. Some embodiments allow fluids such as flue gas, which may contain $H_2S$, nitrogen oxides, sulfur oxides, carbon monoxide and/or carbon dioxide, to be introduced into a solid carbonaceous subterranean formation to enhance the recovery of methane from the formation. The invention also provides an efficient means for producing a nitrogen-enriched effluent stream which can be utilized to enhance the recovery of methane from a solid carbonaceous subterranean formation.

Numerous other advantages and features of the present invention will become readily apparent from the following detailed description of the invention, the embodiments described therein, the claims, and the accompanying drawings.

BRIEF DESCRIPTION OF THE DRAWINGS

FIG. 3 is a graph of the volume percent of methane predicted to be present in the effluents recovered from the coalbed of FIG. 1.

FIG. 4 is a graph of the volume percent of nitrogen predicted to be present in the effluents recovered from the coalbed of FIG. 1.

DESCRIPTION OF THE EMBODIMENTS

Figure 1:
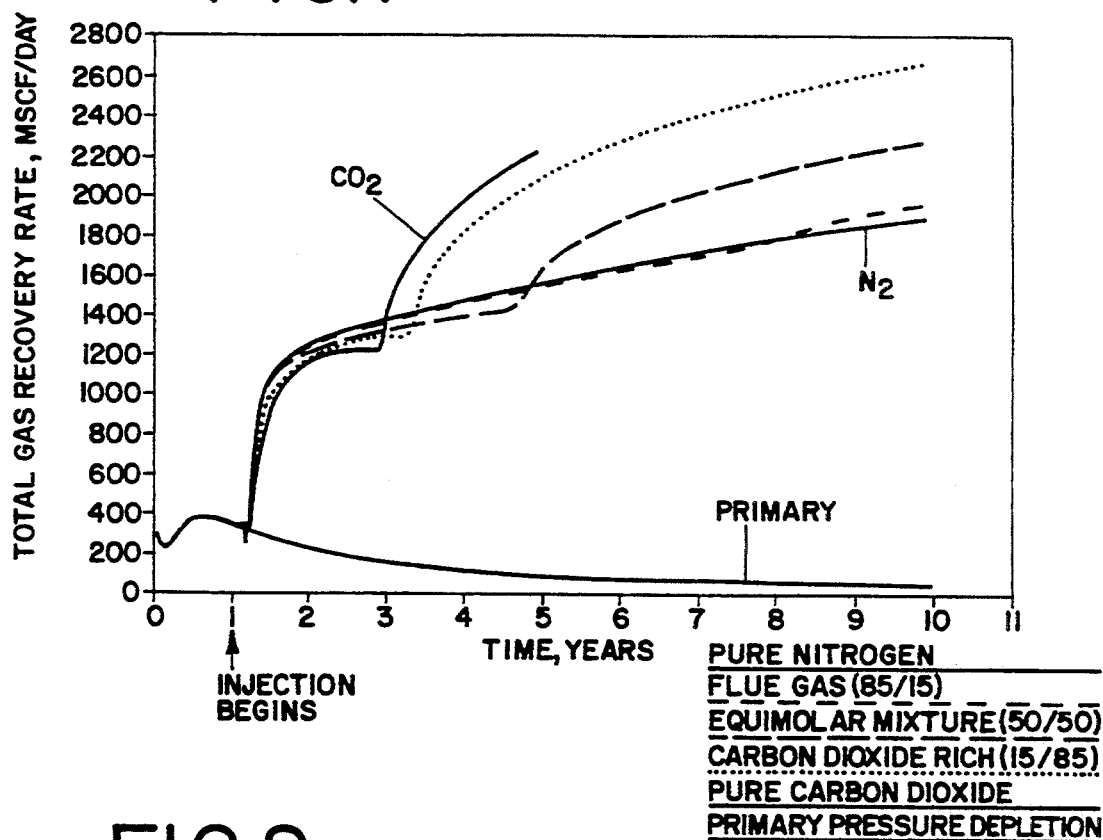
FIG. 1 is a graph of the total gas production rate over time from a fully methane-saturated coalbed into which several different gaseous compositions have been introduced.
Figure 2:
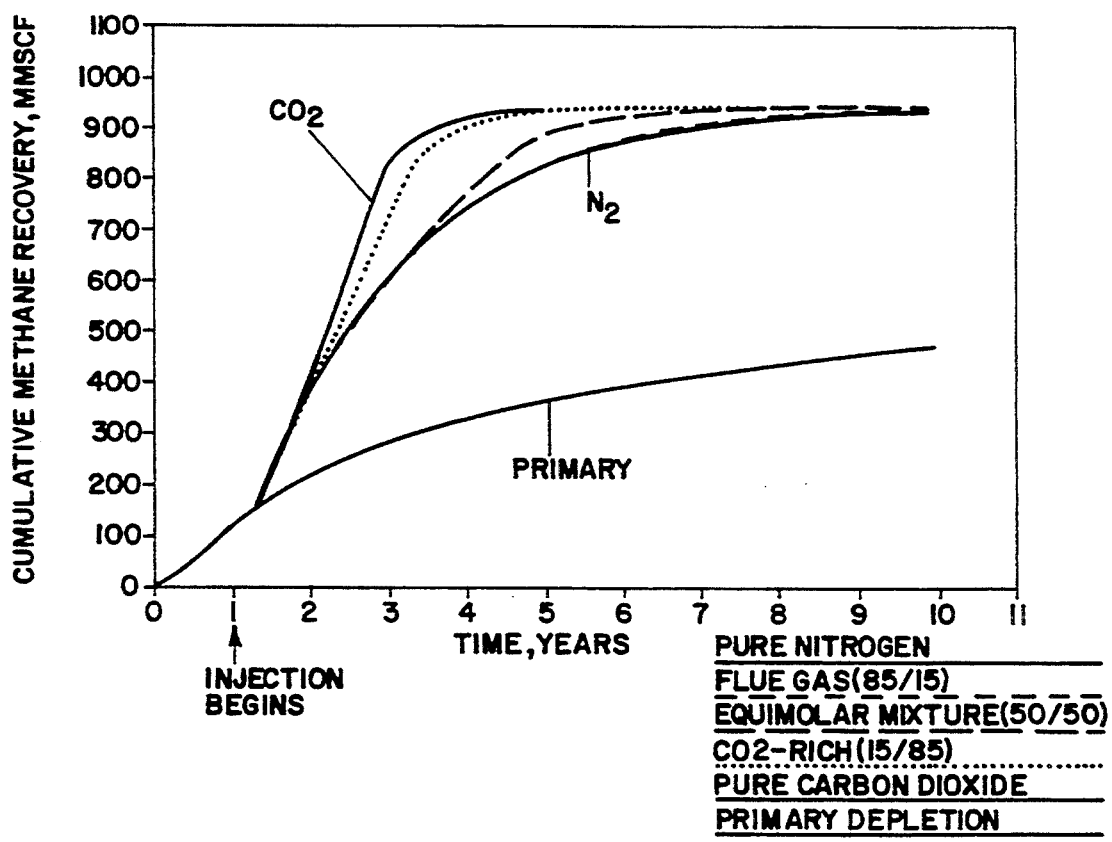
FIG. 2 is a graph of the cumulative methane predicted to be recovered from the coalbed of FIG. 1.

While this invention is susceptible of embodiment in many different forms, there is shown in the FIGS., and will herein be described in detail, specific embodiments of the invention. It should be understood, however, that the present disclosure is to be considered an exemplification of the principles of the invention and is not intended to limit the invention to the specific embodiments illustrated.

Solid carbonaceous subterranean formations, such as coal seams, are comprised of carbonaceous material. The carbonaceous material includes a matrix, having an extensive system of micropores, and a system of fractures which penetrate the matrix, commonly referred to as "cleats". The system of micropores provides a large internal surface on which gaseous fluids can adsorb. The present invention exploits the differing adsorption strengths of various gaseous fluid molecules on the carbonaceous material of the formation.

In general, a gaseous fluid molecule that has a relatively stronger adsorption strength will preferentially sorb to the carbonaceous material of the formation over a gaseous fluid molecule that has a weaker adsorption strength. An important factor in the operation of the present invention is the relative adsorption strengths of the components of an injected mixture of gaseous fluids to one another and to any fluids, such as methane, which may already be present within the formation.

For a carbonaceous material such as coal, it is believed that the atmospheric boiling point of a fluid is indicative of the relative adsorption strength of the molecules or compounds which make up the fluid. Table 1 lists the atmospheric boiling point of several common fluids.

TABLE I

| Compound/Molecule | Boiling Point | |
|---|---|---|
| Helium (He) | −452° F. | Weaker Adsorption Strength |
| Hydrogen ($H_2$) | −423° F. | |
| Nitrogen ($N_2$) | −320.4° F. | |
| Carbon Monoxide (CO) | −313° F. | |
| Argon (Ar) | −303° F. | |
| Oxygen ($O_2$) | −297° F. | |
| Methane ($CH_4$) | −259° F. | |
| Nitric Oxide (NO) | −239.8° F. | |
| Xenon (Xe) | −162.5° F. | |
| Ethane ($C_2H_6$) | −127° F. | |
| Carbon Dioxide ($CO_2$) | −109° F. | |
| Sulfur Hexafluoride ($SF_6$) | −83° F. | |
| Hydrogen Sulfide ($H_2S$) | −75.28° F. | |
| Propane ($C_3H_8$) | −44° F. | |
| Sulfur Dioxide ($SO_2$) | 14° F. | |
| Nitrogen Dioxide ($NO_2$) | 70° F. | |
| Sulfur Trioxide ($SO_3$) | 112° F. | Stronger Adsorption Strength |

It is believed that, in general, the stronger adsorbing fluids have higher boiling points and the weaker adsorbing fluids have relatively lower boiling points. Therefore, the relative adsorption strength of one fluid component to another within a gaseous mixture and to other gaseous fluids within the formation can be determined by comparing their relative atmospheric boiling points. For example, carbon dioxide, with an atmospheric boiling point of −109° F., is relatively more strongly adsorbing to carbonaceous material than methane or nitrogen, which have atmospheric boiling points of −259° F. and −320° F. respectively. The relative atmospheric boiling points of a fluid will provide one of ordinary skill in the art with general information relating to the relative adsorption strength of various gaseous fluids. However, the relative adsorption strength of various gaseous fluids on a particular carbonaceous material of interest should be determined empirically where possible.

Disposal of Strongly Adsorbing Gaseous Fluids

A first embodiment of the invention takes advantage of the large internal surface area available within a solid carbonaceous subterranean formation to dispose of strongly adsorbing fluids such as carbon dioxide. In this embodiment, a desorbing fluid containing a strongly adsorbing fluid is introduced into the solid carbonaceous subterranean formation through an injection well in fluid communication with the formation, and preferably, through an injection well which penetrates the formation. The desorbing fluid may be introduced into the formation in either a gaseous or liquid state. A detailed description of suitable methods for injecting gaseous fluids in accordance with the invention may be found in the discussion relating to the injection of a nitrogen-enriched raffinate discussed below. Other suitable ways of introducing gaseous fluids into a solid carbonaceous subterranean formation are known to one of ordinary skill in the art. If a desorbing fluid containing carbon dioxide is injected in a liquid state, it typically will change to a gaseous fluid within the formation. Alternatively, the desorbing fluid may be introduced into the formation as a super-critical fluid. Depending on the temperatures and pressures within the formation, the desorbing fluid may either be maintained in the formation as a super-critical fluid or it may become a liquid, a gaseous fluid, or a coexisting liquid and vapor. If the desorbing fluid utilized is near its critical temperature and pressure, it may be necessary to operate the production wells in a manner which will minimize the precipitation and/or condensation of solids and liquids within the formation. A more detailed description of how to operate the production wells in such a situation is described below.

The desorbing fluid typically is comprised of carbon dioxide and other fluid components, for example nitrogen and/or methane. Because carbon dioxide is a strongly adsorbing fluid, it will preferentially adsorb to the carbonaceous material of the formation over other weaker adsorbing fluids such as nitrogen or methane.

The preferential sorption of stronger adsorbing fluids, such as carbon dioxide, within the carbonaceous matrix of the formation causes the injected desorbing fluid to be fractionated within the formation. The stronger adsorbing fluids will be preferentially sorbed to the region of the carbonaceous matrix surrounding the injection well into which the desorbing fluid is being introduced. The stronger adsorbing fluids will continue to sorb to the matrix in the region until the matrix is saturated with stronger adsorbing fluid. The relatively weaker adsorbing fluids will not sorb as strongly to the matrix and therefore will move faster through the formation than the stronger adsorbing fluids.

In general, as desorbing fluid is injected into the formation, the region within the formation which is saturated with stronger adsorbing fluid is being continually advanced forward toward a production well or wells. Therefore, it can be said that the stronger adsorbing fluids will form what approximates a concentration front that advances within the formation. As desorbing fluid is injected into the formation, the concentration front is continually being swept from an injection well toward a region of lower pressure within the formation, such as a production well.

Ahead of the front, the concentration of the stronger adsorbing fluids sorbed to the matrix is small relative to the concentration of stronger adsorbing fluids within the front or behind the front. Behind the front, the relative concentration of stronger adsorbing fluids, such as carbon dioxide, sorbed to the matrix approaches an steady-state value as desorbing fluid is continually injected into the formation through the injection well.

The steady-state value is dependent on several factors including: the relative adsorption strength of the stronger adsorbing fluids to the carbonaceous matrix as compared to the adsorption strength of the other fluids within the formation; and the relative concentration of the stronger adsorbing fluids contained within the injected desorbing fluid introduced into the formation.

Since the stronger adsorbing fluid components will be preferentially sorbed by the formation, a desorbing fluid containing carbon dioxide can be injected into a solid carbonaceous subterranean formation while an effluent having a lower carbon dioxide volume percent is recovered from a production well. The volume percentage of carbon dioxide within a mixture of gaseous fluids is sometimes hereafter referred to as a volume percentage A.

Also, because the stronger adsorbing fluid components will move more slowly through the formation than the weaker adsorbing fluid components, an effluent, having a volume ratio of carbon dioxide to other injected desorbing fluid components which is less than the volume ratio of carbon dioxide to other injected fluid components within the desorbing fluid introduced into the formation, can be recovered from a production well. The volume ratio of carbon dioxide to other injected desorbing fluid components is sometimes referred to hereafter as a ratio B.

One type of carbon dioxide containing gaseous fluid which may be utilized in the invention is flue gas. Typically, the volume ratio B of carbon dioxide to other injected desorbing fluid components within flue gas is from 1/11 to 2/8. Another example of a carbon dioxide-containing gaseous fluid which may be utilized in the invention is a mixture of gaseous fluids which is rejected by a nitrogen rejection unit or a membrane separator which is separating carbon dioxide from a natural gas production stream. Typically, the rejected stream contains a volume ratio B of carbon dioxide to methane and other gases of from 1/1 to 95/5.

It is believed the volume percentage of carbon dioxide in the effluent recovered from a production well will be less than the volume percentage of carbon dioxide in the injected desorbing fluid introduced into the formation until the region of the formation between an injection well and the production well becomes saturated with stronger adsorbing fluid components. Additionally, it is believed the volume ratio of carbon dioxide to other injected desorbing fluid components contained in an effluent recovered from a production well will be less than the volume ratio of carbon dioxide to other injected desorbing fluid components within the desorbing fluid introduced into the formation, until the region of the formation between an injection well and the production well becomes saturated with stronger adsorbing fluid components.

In an ideal situation, the solid carbonaceous subterranean formation is uniform, and a carbon dioxide concentration front will move radially outwardly from an injection well into the formation. However, there are very few solid carbonaceous subterranean formations that show such uniformity. Most formations have regions through which the injected desorbing fluid will rapidly pass. These so-called "stringers" include regions of relatively higher permeability compared with the majority of the carbonaceous material. Stringers also include regions that are comprised of materials to which the desorbing fluid components do not readily adsorb. Examples of stringer regions that do not readily adsorb fluids include sandstone, carbonaceous shale, and other similar types of materials known to one of ordinary skill in the art.

The injected desorbing fluid which passes through the stringers will at least partially bypass the carbonaceous material of the formation and is said to "streak" within the formation toward a production well. The streaking will increase the relative amount of desorbing fluid present within an effluent recovered from a production well.

Additionally, injected desorbing fluid which travels through a stringer to a production well does not contact as much of the carbonaceous matrix of the formation as injected desorbing fluids which do not travel through stringers. Therefore, injected desorbing fluid which travels through a stringer to a production well will not be as effectively fractionated into its respective components. Consequently, the volume ratio of carbon dioxide to other injected desorbing fluid components within the effluent recovered from the production well will be increased above what would be expected in an idealized formation, but the ratio should still be reduced relative to the initial ratio B contained in the injected desorbing fluid.

The preferential sorbtion of the stronger adsorbing fluid components within the formation, which causes the stronger adsorbing fluid components move more slowly through the formation than the weaker adsorbing fluid components, allows stronger adsorbing fluids, such as carbon dioxide, to be disposed of within the formation. The methods for disposing of carbon dioxide and other stronger adsorbing fluids within a solid carbonaceous subterranean formation are discussed below.

In a second embodiment of the invention, a relatively stronger adsorbing fluid, such as carbon dioxide, is disposed of within the formation while methane is simultaneously recovered from the formation. It is believed that the injection of a carbon dioxide containing desorbing fluid into the formation will enhance the recovery of methane from the formation.

During the conversion of organic matter to coal and other solid carbonaceous substances, methane is produced. The methane exists within the formation both as free gas in the cleats and fractures of the formation and as sorbed gas within the carbonaceous matrix of the formation.

A carbon dioxide-containing desorbing fluid mobilizes both the free methane and the sorbed methane within the formation. The mobilization of the methane sorbed to the carbonaceous matrix occurs as a result of a lowering of the partial pressure of methane within the cleats and because carbon dioxide and other injected desorbing fluids competitively sorb to the carbonaceous matrix of the formation.

The partial pressure of methane within the cleats is lowered due to the presence of injected desorbing fluid within the cleats near methane sorption sites. As the partial pressure of methane within the cleats is lowered, methane sorbed to the carbonaceous matrix will desorb from the matrix and diffuse to the cleats.

The competitive sorption of carbon dioxide and other injected desorbing fluids to the carbonaceous matrix will also cause methane to desorb from the carbonaceous matrix into the cleats. Once methane is within a cleat, the pressure gradient developed between the formation and a production well and/or wells will move the methane to the production well or wells where it can be recovered.

As discussed earlier, fluids which are not as strongly adsorbed to a carbonaceous matrix as carbon dioxide, such as methane and nitrogen, will move faster through a solid carbonaceous subterranean formation. These weaker adsorbing fluids will have a higher concentration ahead of a carbon dioxide front than their relative concentration in the injected desorbing fluid. Therefore, over time within the solid carbonaceous subterranean formation, there is a faster moving wave of weaker adsorbing fluids which will move ahead of the carbon dioxide concentration front. The weaker adsorbing fluids will be followed by a slower moving carbon dioxide concentration front which will displace the last of the methane from the carbonaceous matrix of the formation as it moves through the formation from an injection well to the production wells.

The ability of a solid carbonaceous subterranean formation to fractionate the injected desorbing fluid, with the majority of the carbon dioxide reaching the production well and/or wells at a later time than methane and/or other fluid having weaker adsorption strengths, provides a method for recovering a substantial portion of the methane from a solid carbonaceous subterranean formation while simultaneously disposing of carbon dioxide within the formation.

As the method is carried out, the ratio of carbon dioxide to other injected desorbing fluids within the recovered effluent is preferably monitored at a production well or wells using methods known to one of ordinary skill in the art, such as a gas chromatography. This monitoring should provide a relative indication of how the injected desorbing fluids are moving within the formation and whether the formation is becoming saturated with stronger adsorbing fluids.

As discussed earlier, the volume ratio of carbon dioxide to other injected desorbing fluid components within the effluent recovered at a production well will be reduced relative to the volume ratio of carbon dioxide to other injected desorbing fluid components within the injected desorbing fluid introduced into the solid carbonaceous subterranean formation.

The ratio of carbon dioxide to other injected desorbing fluid components recovered at a production well should rapidly increase once a carbon dioxide front reaches the wellbore of a production well. See for example FIGS. 4, 5, 13, and 14. Also, the majority of the methane originally sorbed within the carbonaceous matrix located along the flow path of the injected desorbing fluid between an injection well and a production well will have been desorbed from the formation once the carbon dioxide concentration front has traveled from an injection well to a production well (i.e. the carbonaceous matrix within the formation between an injection well and a production well along the flow path of the injected desorbing fluid will have been swept of the methane contained therein.)

Also, as discussed earlier, actual solid carbonaceous subterranean formations have stringers which can increase the volume percentage of the desorbing fluid contained within the effluent recovered from the formation. Additionally, the amount of injected desorbing fluid required to sweep a formation can be increased due to the stringers.

One method which the inventors believe can effectively reduce the amount of streaking which occurs within the formation utilizes the intermittent injection of a liquid such as water into an injection well. The injected water should selectively enter the higher permeability regions. Once the liquid enters the higher permeability regions it should reduce the flow of desorbing fluids through these regions. This will cause the injected desorbing fluid to be redirected into regions of lower permeability, thereby increasing the vertical and areal sweep within the formation. By redirecting the injected desorbing fluids into regions of lower permeability, the time it takes for those fluids to travel from an injection well to a production well is increased. Also, because the redirected injected desorbing fluid may come into contact with more carbonaceous material of the formation, the volume percentage of carbon dioxide within the effluent recovered from the production well and the volume ratio of carbon dioxide to other injected desorbing fluid components within the effluent recovered from a production well may be reduced.

Whether or not to cease recovery of effluent from a production well depends in part on the percentage of the available methane which has been recovered from the area of the formation drained by the production well. The available methane is that methane which is available for recovery from a production well. It should be noted that the methane available within the formation undergoing enhanced recovery may not be depleted, but the methane available for a specific production well may have been depleted. The quantity of methane contained in a solid carbonaceous subterranean formation can be determined by methods known to one of ordinary skill in the art. Examples of methods for calculating the quantity of methane within a formation are set forth in Yee et al. "Gas Sorption on Coal and Measurement of Gas Content", Chapter 9, pages 203–217, *Hydrocarbon from Coal*, published by the American Association of Petroleum Geologists ( 1993 ) which is hereby incorporated by reference. One of ordinary skill in the art who knows the quantity of methane contained in a formation and the composition of the injected desorbing fluid can calculate the available methane which can be recovered from the formation.

The decision of whether to continue to recover effluent from a production well also should take into consideration the value of the effluent. When determining the value of the effluent, it is important to take into consideration the processing costs required to further utilize the effluent stream. For example, if the effluent stream is to be sent to a natural gas pipeline the effluent stream may have to be processed to lower the percentage of inert gases contained therein to an acceptable level. The acceptable level for inert gases contained in natural gas is governed by natural gas pipeline specifications. If the value of the effluent is not great enough to justify further recovery of the effluent, then recovery of the effluent should be ceased or the method should be modified in an attempt to change the composition of the effluent stream to a point where further recovery is justified.

A methane containing solid carbonaceous subterranean formation under development may have several injection wells and several production wells. Due to the heterogeneity of most solid carbonaceous subterranean formations, a carbon dioxide concentration front from one injection well may reach a production well before the carbon dioxide concentration front from a second injection well reaches the same production well. This could cause the volume ratio of carbon dioxide to other injected desorbing fluid components within the effluent recovered from a production well to increase and approach or exceed the initial ratio B before the formation between the injection wells and a production well has been swept of available methane.

As can be seen from FIGS. 2, 3, 5–7, and 11–15, A substantial percentage of the available methane may be recovered from a formation before the ratio of carbon dioxide to other injected desorbing fluid components within the effluent recovered from a production well reaches a value equal to the initial ratio B. It is believed that in some situation it is preferable to cease recovering effluent from the production well when the ratio B is from 0.5 to 0.9 the value of the initial ratio B. For example, when the ratio of carbon dioxide to other injected desorbing fluid components within the recovered effluent is less than B, but a substantial percentage of the available methane has been recovered from the production well, it may be preferable to cease recovery of effluent from the production well.

If the volume ratio of carbon dioxide to other injected desorbing fluid components within the effluent recovered from a production well is greater than the initial ratio B and a substantial percentage of the available methane has been produced from that well, recovery from that production well preferably is ceased.

If the volume ratio of carbon dioxide to other injected desorbing fluid components within the effluent recovered from a production well is greater than the initial ratio B, but there is a substantial percentage of methane still available to be produced from that production well, the recovery of effluent from that production well is not preferably ceased. Instead, the flow of effluent from the production well should be restricted.

The restriction of flow from a production well will increase the pressure within the well. This increase in pressure near the production well will cause the injected desorbing fluids to be redirected to areas of the formation with relatively lower pressure. This restriction will improve the sweep of the formation and also reduce the streaking of injected desorbing fluid toward the production well from which flow has been restricted. Additionally, it is believed that by increasing the pressure in the formation surrounding a production well, the preferential adsorption of carbon dioxide over methane to the carbonaceous matrix will be enhanced. It is believed this will reduce the volume percentage of carbon dioxide contained in the effluent recovered from the production well.

Several procedures may be utilized to restrict the flow of effluent from a production well. One procedure utilizes the introduction of a flow restricting material into the subterranean formation adjacent the production well from which flow is desirably restricted. Examples of materials useful for restricting the flow of effluent from a production well include, for example, carbon dioxide, acetone, pyridene diesel oil, polymers, epoxy, surfactant, foam, cement and mixtures thereof. The above listed materials reduce the flow of desorbing fluid within the formation by plugging or binding the fracture system of the formation, thereby reducing the permeability of the affected area of the formation. In addition to the above listed materials, any material which causes the carbonaceous matrix to swell, thereby reducing its permeability, or plugs or binds the fracture system of the formation can be utilized.

Another method for restricting the flow of effluent from a production well involves operating a valve in fluid communication with the production well in such a manner that the flow of effluent from that production well is restricted. As with the earlier described techniques, the restriction of flow of effluent from the production well will increase the pressure within the well near the formation and provide the earlier discussed benefits which are believed to result from an increase in the pressure within the formation near a production well.

The above discussed procedures should assist in allowing the remaining methane available to the production well of interest to be recovered.

Any carbon dioxide which is recovered with the effluent is readily separable from the methane and other fluids present in the effluent, such as nitrogen. Examples of processes for separating carbon dioxide from an effluent stream include:

separation of carbon dioxide from a gaseous mixture using a membrane separator;

separation of carbon dioxide from a gaseous mixture using an adsorptive type separator, such as a pressure swing adsorptive separator; and cryogenic separation of carbon dioxide from a gaseous mixture using a nitrogen rejection type unit.

The carbon dioxide containing stream which is produced by the above processes also typically contains methane and/or nitrogen. If desired, the carbon dioxide-containing stream can be reinjected into the solid carbonaceous subterranean formation.

It has been discovered by the inventors that it may be desirable in some instances to continue to recover effluent from a production well and reinject a substantial portion of the effluent stream back into the formation. Examples of situations where this may be advantageous are where there is a substantial amount of available methane to be recovered from a production well, but the volume percentage of the carbon dioxide in the effluent stream is high. In this type of situation, the cost of separating the inert gases, such as carbon dioxide and nitrogen from the methane using conventional separation means, may be prohibitive.

In these situations, the inventors have discovered that it may be more advantageous to use the effluent stream to enhance the recovery of methane from another solid carbonaceous subterranean formation or a different region of the same solid carbonaceous subterranean formation. Preferably, the formation into which the effluent is injected is still capable of adsorbing a large quantity of carbon dioxide.

The reinjected stream will be fractionated by the formation. The carbon dioxide contained in the reinjected stream will move slowly through the formation toward the production wells. As discussed earlier, the carbon dioxide will displace the methane from the formation. The methane contained in the reinjected stream should travel faster through the formation toward a production well. It is believed the methane contained in the reinjected stream will also help in maintaining the reservoir pressure of the formation and therefore assist in recovering methane from the formation. FIGS. 11 through 18 graphically illustrate how in some circumstances a mixture of gaseous fluids containing methane and carbon dioxide advantageously can be used to recover methane from a solid carbonaceous subterranean formation.

Fractionation of a Mixture of Gaseous Fluids

In a third embodiment of the invention, a mixture of gaseous fluids containing relatively stronger adsorbing fluid components and relatively weaker adsorbing fluid components is introduced into a solid carbonaceous subterranean formation through an injection well in fluid communication with the formation. The relatively stronger adsorbing fluid components of the gaseous mixture will be preferentially adsorbed to the carbonaceous matrix of the formation. The current invention takes advantage of this preferential adsorption of the stronger adsorbing fluid components to the formation to provide a method for fractionating the mixture of gaseous fluids into a first fraction enriched in relatively weaker adsorbing fluids and a second fraction enriched in relatively stronger adsorbing fluids. Examples of mixtures of gaseous fluids which may be fractionated include, but are not limited to: air, flue gas, the gaseous mixtures produced from various industrial processes, and the gaseous mixtures that are discharged from a separation unit which is separating nonflammable gases and condensible liquids from a natural gas production stream.

In this embodiment of the invention, the mixture of gaseous fluids typically is introduced into a solid carbonaceous subterranean formation through an injection well which penetrates the formation. Preferably, the formation already has been depleted of recoverable methane. A formation which is depleted of recoverable methane still contains some methane, but the methane is at such a low concentration that it is not economical to recover it from the formation. Using such a depleted formation should provide for better fractionation of the injected gaseous fluid. The pressure established on the formation will enhance the fractionation of the mixture of gaseous fluids into a fraction enriched in stronger adsorbing fluids and a fraction enriched in relatively weaker adsorbing fluids. In general, the higher the pressure on the formation, the more gas which can adsorb to the carbonaceous matrix of the formation.

The fraction enriched in weaker adsorbing fluids (hereinafter sometimes referred to as the raffinate) is typically withdrawn from the formation through a production well. The raffinate will be enriched in relatively weaker adsorbing fluids because the relatively stronger adsorbing fluids which are preferentially adsorbed by the carbonaceous matrix will travel slower through the formation as described previously.

The raffinate is typically recovered from the formation until the concentration of stronger adsorbing fluids in the raffinate increases above an acceptable level. For a mixture of gaseous fluids containing carbon dioxide, the volume percentage of carbon dioxide in the raffinate is preferably maintained less than 50 percent, more preferably less than 20 percent, most preferably less than 5 percent. In some situations, it may be possible to maintain the volume percentage of carbon dioxide in the raffinate at less than 1 percent.

Alternatively, the injection of the mixture of gaseous fluids is continued until a desired saturation of the formation is achieved. The desired adsorptive saturation of the formation can be determined by routine experimentation. For example, the mixture of gaseous fluids can be injected until the volume ratio of the relatively stronger adsorbing fluids within the raffinate increases above an acceptable level as described above. Once the desired adsorptive saturation of the formation is reached, the carbonaceous matrix's adsorptive capacity can be regenerated by reducing the total pressure on the formation. A desorbed adsorbate,-which is enriched in relatively stronger adsorbing fluids, is released from the carbonaceous matrix of the formation as the total pressure of the formation is reduced. This desorbed adsorbate may be recovered from the formation through an injection and/or a production well.

If the mixture of gaseous fluids which is fractionated within the formation contains carbon dioxide, for example, flue gas, the desorbed adsorbate will be enriched in carbon dioxide. If the gaseous mixture contains oxygen, for example, air, the desorbed adsorbate will be enriched in oxygen. The recovered desorbed adsorbate can be reinjected into a solid carbonaceous subterranean formation. For example, if a mixture of gaseous fluids containing carbon dioxide is fractionated within a solid carbonaceous subterranean formation, the recovered desorbed adsorbate would be enriched in carbon dioxide. The recovered desorbed adsorbate enriched in carbon dioxide could be used to enhance the recovery of methane from a solid carbonaceous subterranean formation.

It may be desirable to maintain the relatively strongly adsorbing fluids within the formation. In this situation, the pressure on the formation is not reduced and the adsorptive capacity of the carbonaceous matrix of the formation is not regenerated. Alternatively, the adsorptive capacity of the carbonaceous matrix of the formation can be partially regenerated without lowering the total pressure to the point where undesirable components such as carbon dioxide, hydrogen sulfide, or carbon monoxide, if present, may be desorbed and released from the matrix.

In general, the pressure utilized during the fractionation of the gaseous mixture of fluids is selected so as to optimize the fractionation of the fluid. In general, the higher the pressure utilized, the more gas which can be adsorbed by the carbonaceous matrix of the formation. For a given system, the faster the removal of raffinate from the system, the higher the volume percentage of the relatively strongly adsorbing fluids within the raffinate.

If the gaseous mixture of fluids to be fractionated contains a large volume percentage of nitrogen, the resulting raffinate will be enriched in nitrogen. Examples of gaseous mixtures of fluids which contain a large volume percentage of nitrogen include air and flue gas. The nitrogen-enriched raffinate produced from these gaseous mixtures of fluids can be utilized to enhance the recovery of methane from a solid carbonaceous subterranean formation. If flue gas is used, it should preferably be de-watered before it is injected into the formation. It is believed de-watering will reduce potential corrosion problems that can result in injection equipment and wellbores as a result of injecting flue gas into a formation.

The nitrogen-enriched raffinate is injected into a solid carbonaceous subterranean formation at a pressure higher than the reservoir pressure of the formation. Preferably, the nitrogen-enriched raffinate is injected at a pressure of from about 500 p.s.i.g. to about 1500 p.s.i.g. above the reservoir pressure of the formation. If the injection pressure is below or equal to the reservoir pressure, the nitrogen-enriched raffinate typically cannot be injected because it cannot overcome the reservoir pressure. The nitrogen-enriched raffinate is injected preferably at a pressure below the formation parting pressure of the solid carbonaceous subterranean formation. If the injection pressure is too high and the formation extensively fractures, injected nitrogen-enriched raffinate may be lost and less methane may be produced.

However, based on studies of other types of reservoirs, it is believed that nitrogen-enriched raffinate may be injected into the formation at pressures above the formation parting pressure as long as induced fractures do not extend from an injection well to a production well. In fact, injection above formation parting pressure may be required in order to achieve sufficient injection and/or recovery rates to make the process economical or, in other cases, may be desired to achieve improved financial results when it can be done without sacrificing overall performance. Preferably, the fracture half-length of the induced fractures within the formation is less than from about 20% to about 30% of the spacing between an injection well and a production well. Also, preferably, the induced fractures should be maintained within the formation.

Parameters important to the recovery of methane, such as fracture half-length, fracture azimuth, and height growth, can be determined using formation modeling techniques which are known in the art. Examples of the techniques are discussed in John L. Gidley, et al., Recent Advances in Hydraulic Fracturing, Volume 12, Society of Petroleum Engineers Monograph Series, 1989, pp. 25–29 and pp. 76–77; and Schuster, C. L., "Detection Within the Wellbore of Seismic Signals Created by Hydraulic Fracturing", paper SPE 7448 presented at the 1978 Society of Petroleum Engineers' Annual Technical Conference and Exhibition, Houston, Texas, October 1–3. Alternatively, the fracture half-length and impact of its orientation can be assessed using a combination of pressure transient analysis and reservoir flow modeling such as described in paper SPE 22893, "Injection Above-Fracture-Parting Pressure Pilot, Valhal Field, Norway," by N. Ali et al., 69th Annual Technical Conference and Exhibition of the Society of Petroleum Engineers, Dallas, Tex., Oct. 6–9, 1991. While it should be noted that the above reference describes a method for enhancing oil recovery by injection of water above fracture-parting-pressure, it is believed that the methods and techniques discussed in SPE 22893 can be adapted to enhance the recovery of methane from a solid carbonaceous subterranean formation.

In general, the deeper the solid carbonaceous subterranean formation, the higher the pressure necessary to inject the nitrogen-enriched raffinate into the formation. Typically, an injection pressure of from about 400 to 2000 p.s.i.g. will be sufficient to inject nitrogen-enriched raffinate into a majority of the formations from which it is desirable to recover methane.

The nitrogen-enriched raffinate is injected into the solid carbonaceous subterranean formation through an injection well in fluid communication with the formation. Preferably, the injection well penetrates the methane-containing formation, but the injection well need not penetrate the formation as long as fluid communication exists between the formation and the injection well. The injection of nitrogen-enriched raffinate may be either continuous or discontinuous. The injection pressure may be maintained constant or varied.

A fluid comprising methane is recovered from a production well in fluid communication with the formation. As with the injection well, the production well preferably penetrates the methane-containing formation, but the production well need not penetrate the formation as long as fluid communication exists between the formation and the production well. The production well or wells are operated in the same manner as conventional coalbed methane recovery wells. It may be desirable to minimize the backpressure on a production well during recovery of fluids comprising methane through that production well. The reduction of back pressure on the production well will assist the movement of the fluid, comprising methane, from the formation to the wellbore.

Preferably, a production well is operated so that the pressure in the production well at a wellbore location adjacent the methane-producing formation is less than the initial reservoir pressure of the formation. The wellbore location adjacent to the methane producing formation is within the wellbore, not the formation. The initial reservoir pressure is the reservoir pressure near the production well of interest at a time before the initial injection of nitrogen-enriched raffinate into the formation. The reservoir pressure may increase during the injection of nitrogen-enriched raffinate, but it is believed that the pressure in the production well near the formation preferably should be maintained less than the initial reservoir pressure. This will enhance the movement of fluid from the formation to the wellbore. Most preferably, the pressure in a production well at a wellbore location adjacent the methane producing formation should be less than about 400 p.s.i.g.

In some instances, back-pressure on a production well's wellbore may be preferable, for example, when it is desirable to maintain a higher reservoir pressure to minimize the influx of water into the formation from surrounding aquifers. Such an influx of water into the formation could reduce the methane recovery rate and also complicate the operation of a production well.

Another situation where it can be preferable to maintain backpressure on a production well's wellbore is when there is concern over the precipitation and/or condensation of solids and/or liquids within the formation near the wellbore or in the wellbore itself. The precipitation and/or condensation of solids or liquids in or near the wellbore could reduce the methane recovery rate from a production well. Examples of materials which may precipitate or condense out near the wellbore and present a problem are wax containing occluded oils which may be mobilized from the matrix and carried toward a production wellbore. It is believed that a higher pressure in the production well's wellbore at a location adjacent to the formation will minimize such precipitation and/or condensation of solids or liquids in or near the wellbore. Therefore, if precipitation and condensation in the wellbore are a problem, it may be preferable to increase the pressure in the production well's wellbore to a value as high as practicable.

The timing and magnitude of the increase in the rate of methane recovery from a production well will depend on many factors, including, for example, well spacing, thickness of the solid carbonaceous subterranean formation, cleat porosity, injection pressure and injection rate, injected gaseous fluid composition, sorbed gas composition, reservoir pressure, permeability of the formation, and cumulative production of methane prior to injection of nitrogen-enriched raffinate.

When the foregoing parameters are generally held constant, a smaller spacing between an injection well and a production well will result in a faster observable production well response (both an increase in the recovery rate of methane and a shorter time before injected nitrogen-enriched raffinate appears at a production well) than the response which occurs with an injection well and a production well separated by a larger spacing. When spacing the wells, the desirability of a fast increase in the rate of methane production must be balanced against other factors such as earlier nitrogen breakthrough when utilizing a reduced well spacing and the quantity of nitrogen-enriched raffinate utilized to desorb the methane from the formation for any given spacing.

If desired, methane produced in accordance with this invention can be separated from co-produced gases, such as nitrogen or mixtures of nitrogen and any other gas or gases which may have been injected or produced from the solid carbonaceous subterranean formation. Such co-produced gases will, of course, include any gases that occur naturally in solid carbonaceous subterranean formations together with the methane. These gases which occur together naturally with the methane are commonly referred to as coalbed methane. These naturally-occurring gases can include, for example, hydrogen sulfide, carbon dioxide, ethane, propane, butane, and heavier hydrocarbons in lesser amounts. If desired, the methane produced in accordance with this invention can be blended with methane from other sources which contain relatively fewer impurities.

EXAMPLE 1

This example shows the predicted response of a coalbed when various desorbing fluids are injected into the coalbed to enhance the recovery of methane from the coalbed. In this Example injection is commenced at the one year point. All the desorbing fluids in this Example are injected into the coalbed at an injection pressure of 2000 p.s.i.a. The desorbing fluids injected into the formation include:

pure nitrogen;

flue gas having 85 volume percent nitrogen and 15 volume percent carbon dioxide;

an equimolar mixture of carbon dioxide and flue gas;

a desorbing fluid having 85 volume percent carbon dioxide and 15 volume percent nitrogen; and pure carbon dioxide.

The data graphed in FIGS. 1–7 are generated from a model which was developed to describe a hypothetical coalbed which is 10 feet thick and is homogeneous throughout in both the vertical and horizontal directions. The data graphed are corrected to a temperature of 60° F. and a pressure of 14.7 p.s.i.a. The hypothetical coalbed has the following characteristics:

permeability = 10 millidarcies;

porosity = 0.5 % reservoir pressure of 1500 p.s.i.a. prior to injection of desorbing fluid; and reservoir temperature = 115° F.

The coalbed is saturated with methane and the area drained by the production well is a 46 acre region of the formation. In the model, it was assumed that the production well was surrounded by four injection wells which are arranged in a five-spot formation. It is assumed that each injection well affects the production well in the same manner and that therefore one quarter of the response in the production well is attributable to each injector. The cumulative desorbing fluid injected into the formation being drained by the production well comes from the four injection wells. Each injection well contributes a quarter of the total desorbing fluid injected.

The model utilized was developed using two-dimensional Virial equations of state. A description of the Virial Equations of State and how to utilize them to produce a model similar to the one used by the inventors' is disclosed in DeGance, "Multicomponent high-pressure adsorption equilibrium on carbon substrates: theory and data," Fluid Phase Equilibria, 78, pages 99–137, (1992) Elsevier Science Publishers B. V., Amsterdam; which is incorporated herein by reference.

Figure 5:
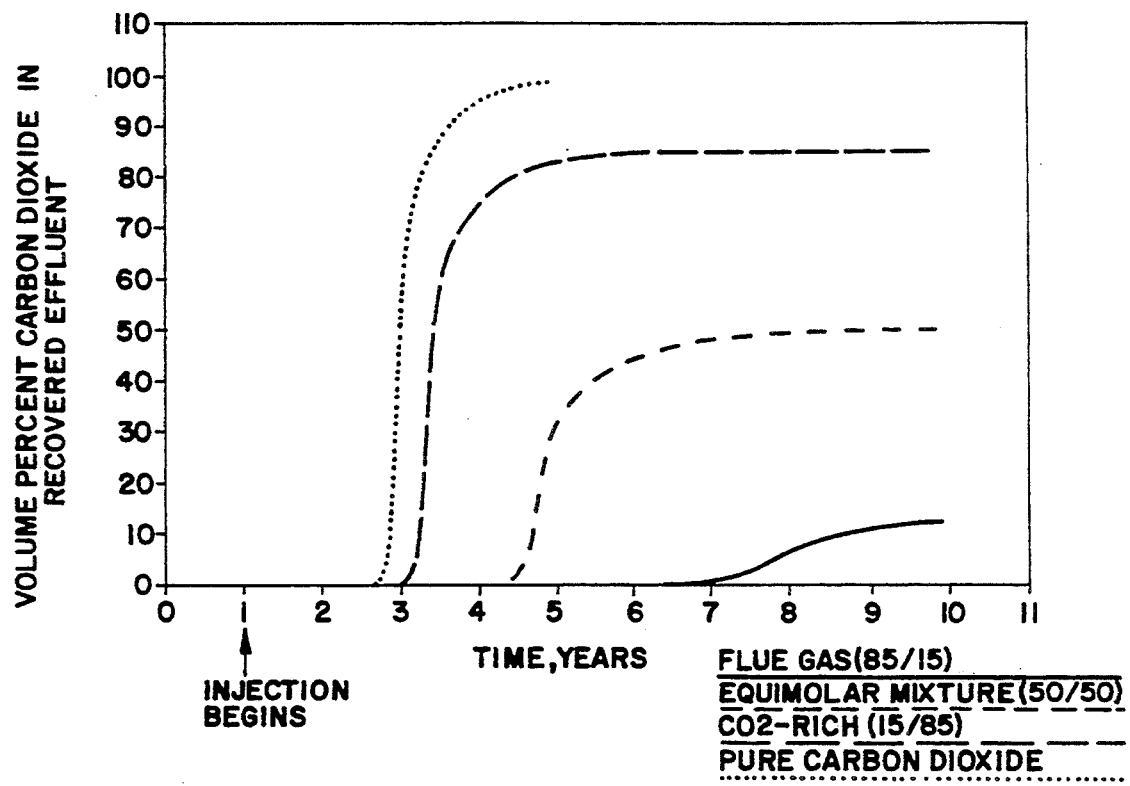
FIG. 5 is a graph of the volume percent of carbon dioxide predicted to be present in the effluents recovered from the coalbed of FIG. 1.
Figure 6:
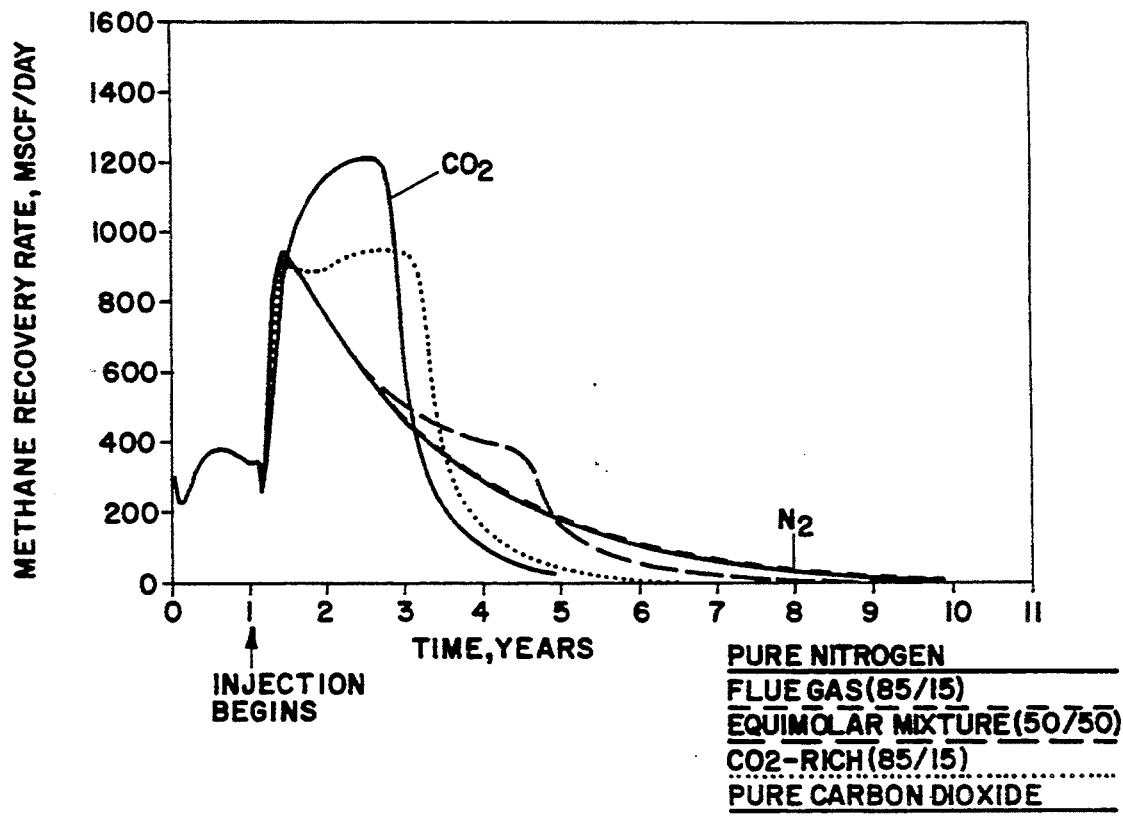
FIG. 6 is a graph of predicted methane recovery rates for the coalbed of FIG. 1.
Figure 7:
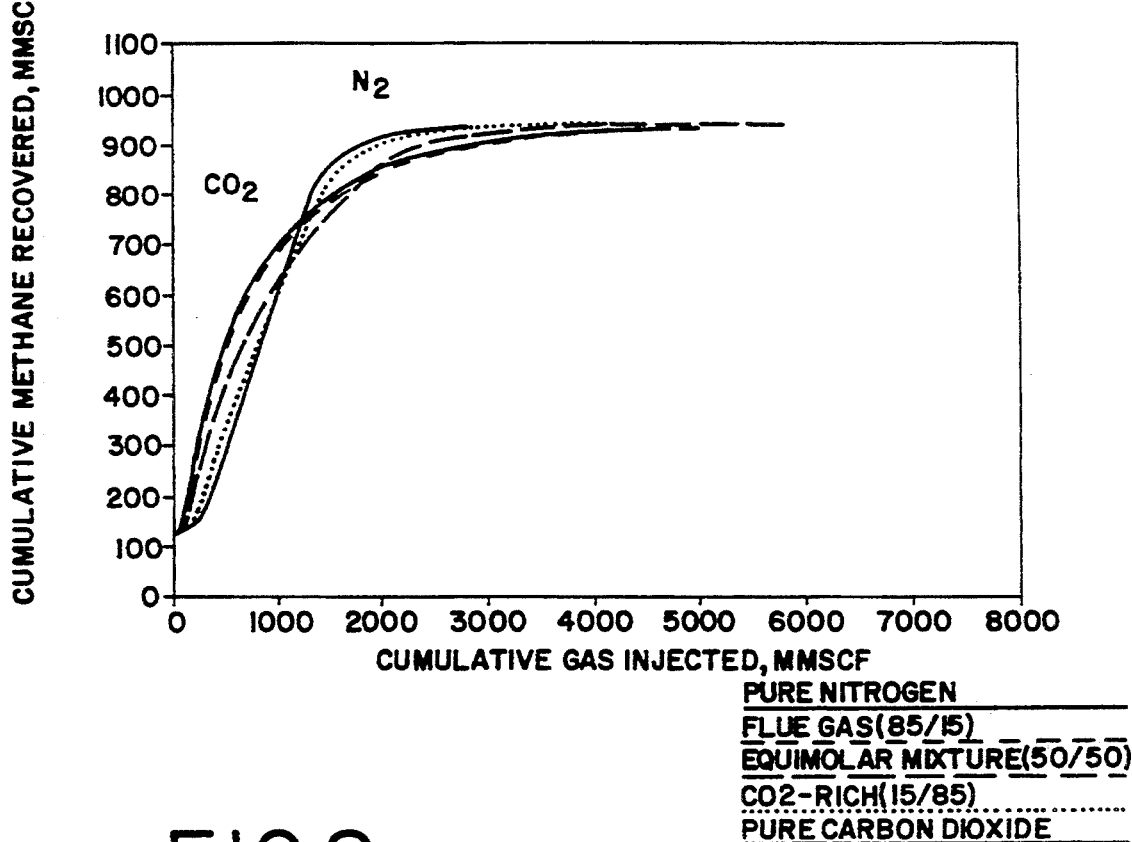
FIG. 7 is a graph of cumulative methane recovered versus cumulative desorbing fluid injected into the coalbed of FIG. 1.

As can be seen from FIGS. 1 and 5, the volume percentage of carbon dioxide in the fluid recovered from a production well is maintained at levels below the volume percentage of carbon dioxide contained in the injected desorbing fluid for an extended period after injection of desorbing fluid is commenced. The volume percentage of carbon dioxide in the recovered effluent starts to increase substantially at approximately the same time as the volume percentage of methane in the recovered effluent starts to decrease. As can be seen from FIGS. 2 and 5, a substantial percentage of the available methane contained in the formation will have been recovered by the time the volume percentage of carbon dioxide in the recovered effluent increases to above the volume percentage of carbon dioxide in the injected desorbing fluid. Also, since methods are available to economically separate carbon dioxide from methane, nitrogen, and other gases, carbon dioxide can be separated from the effluent recovered from a production well and injected back into the coalbed and/or another nearby coalbed.

FIGS. 1–7 also show that a substantial percentage of the available methane can be recovered from the region being drained by a production well before the volume ratio of carbon dioxide to other injected desorbing fluid components contained in the effluent recovered from a production well reaches the magnitude of the volume ratio of carbon dioxide to other injected desorbing fluid components contained within the injected desorbing fluids.

It should be noted that since the model in the above example and the example that follows are idealized, they cannot take account of heterogeneities present in an actual solid carbonaceous subterranean formation. Therefore, this model and the model described in Examples 2 and 3 do not predict the streaking which may occur within the formation. However, the examples disclosed together with the earlier discussion regarding the mitigation of streaking within a formation will enable one of ordinary skill in the art to practice the invention.

EXAMPLE 2

This example shows the predicted response of a coalbed when desorbing fluids containing carbon dioxide are injected into the coalbed to enhance the recovery of methane from the coalbed. Injection of desorbing fluids was commenced in this Example after four years of primary depletion. All the desorbing fluids in this Example are injected into the coalbed at an injection pressure of 2000 p.s.i.a. through injection wells having a skin of −3. The production well had a downhole production pressure of 100 p.s.i.a. and a skin of −3. Skin is a measure of the permeability of the near wellbore formation. A possitive skin indicates near wellbore formation damage and a negative skin indicates near wellbore formation stimulation. The desorbing fluids injected into the formation include:

pure carbon dioxide; and a desorbing fluid having 70 volume percent carbon dioxide and 30 volume percent methane.

The data graphed in FIGS. 11–18 were generated from a model which was developed to describe a hypothetical coalbed which is 50 feet thick and is homogeneous throughout in both the vertical and horizontal directions. The data graphed are corrected to a temperature of 60° F. and a pressure of 14.7 p.s.i.a. The hypothetical coalbed has the following characteristics:

permeability = 5 millidarcies;

reservoir pressure of 1500 p.s.i.a. prior to injection of desorbing fluid; and reservoir temperature = 115° F.

The coalbed is saturated with methane and the area drained by the production well is a 160 acre region of the formation. In the model it is assumed that the production well is surrounded by four injection wells which are arranged in a five-spot formation. It is assumed that each injection well affects the production well in the same manner and that therefore one quarter of the response in the production well is attributable to each injector. The cumulative desorbing fluid injected into the formation being drained by the production well comes from the four injection wells. Each injection well contributes a quarter of the total desorbing fluid injected.

The model utilized was developed using the extended Langmuir adsorption isotherms model. A description of an extended Langmuir adsorption isotherm model and how to utilize it to produce a model similar to the one used by the inventors' is disclosed in L. E. Arri, et. al, "Modeling Coalbed Methane Production with Binary Gas Sorption," SPE 24363, pages 459–472, (1992) Published by the Society of Petroleum Engineers; which is incorporated herein by reference.

This example illustrates that in some situations, which would be known to one of ordinary skill in the art from the foregoing disclosure, that a desorbing fluid comprising carbon dioxide and methane is preferably utilized to recover methane from a solid carbonaceous subterranean formation, especially if the cost of separating methane from a recovered effluent stream is not economically viable. In this situation, the effluent is reinjected into a formation which will adsorb the carbon dioxide components of the stream and allow the methane to pass to a production well where it is recovered.

EXAMPLE 3

Figure 8:
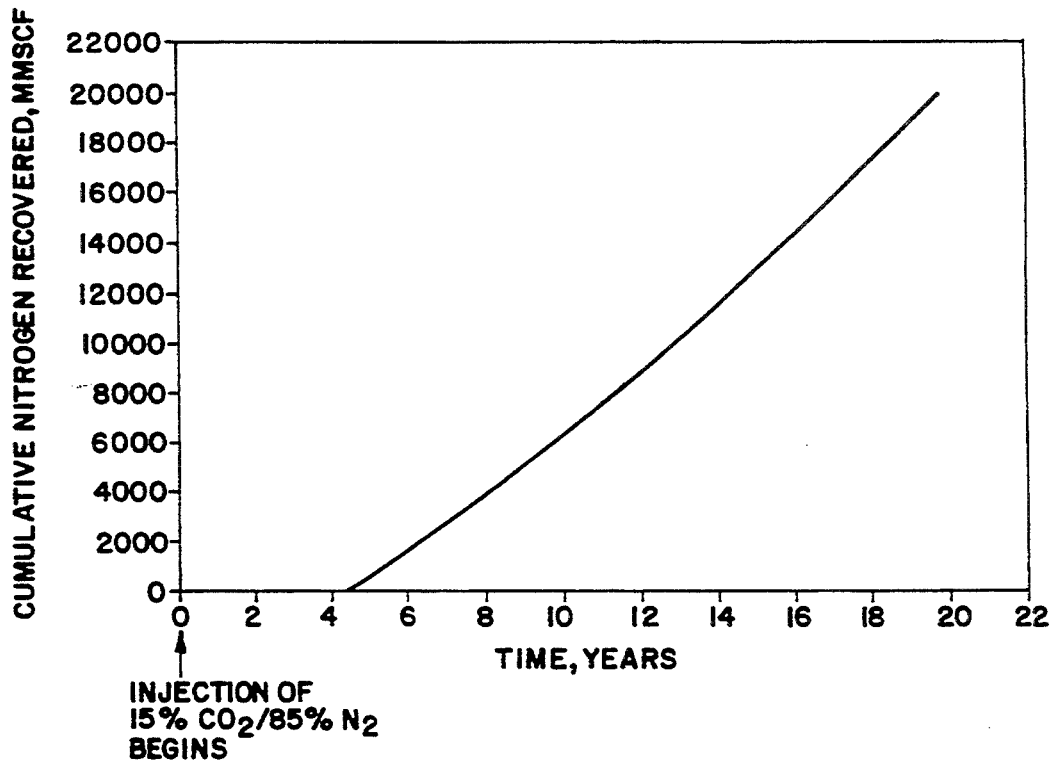
FIG. 8 is a graph of the cumulative volume of nitrogen recovered from a methane-depleted coalbed which is used to fractionate a mixture of gaseous fluids containing 15 volume percent carbon dioxide and 85 volume percent nitrogen.
Figure 9:
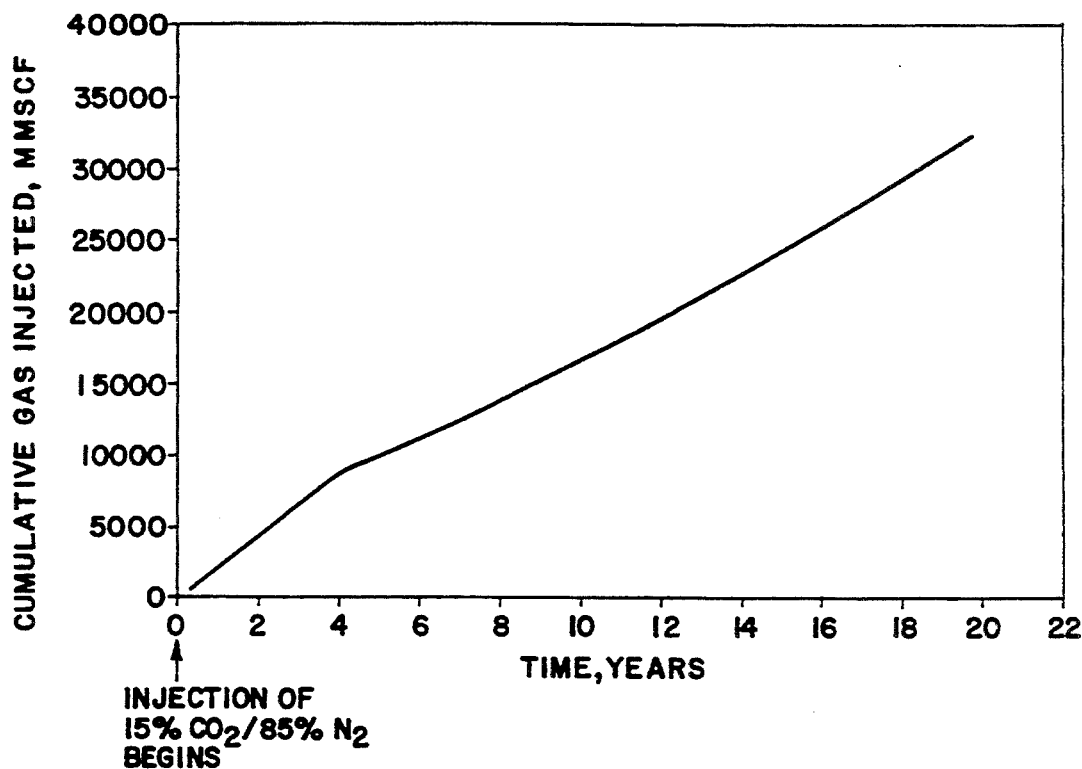
FIG. 9 is a graph of the cumulative mixture of gaseous fluids which are injected over time into the depleted coalbed of FIG. 8.
Figure 10:
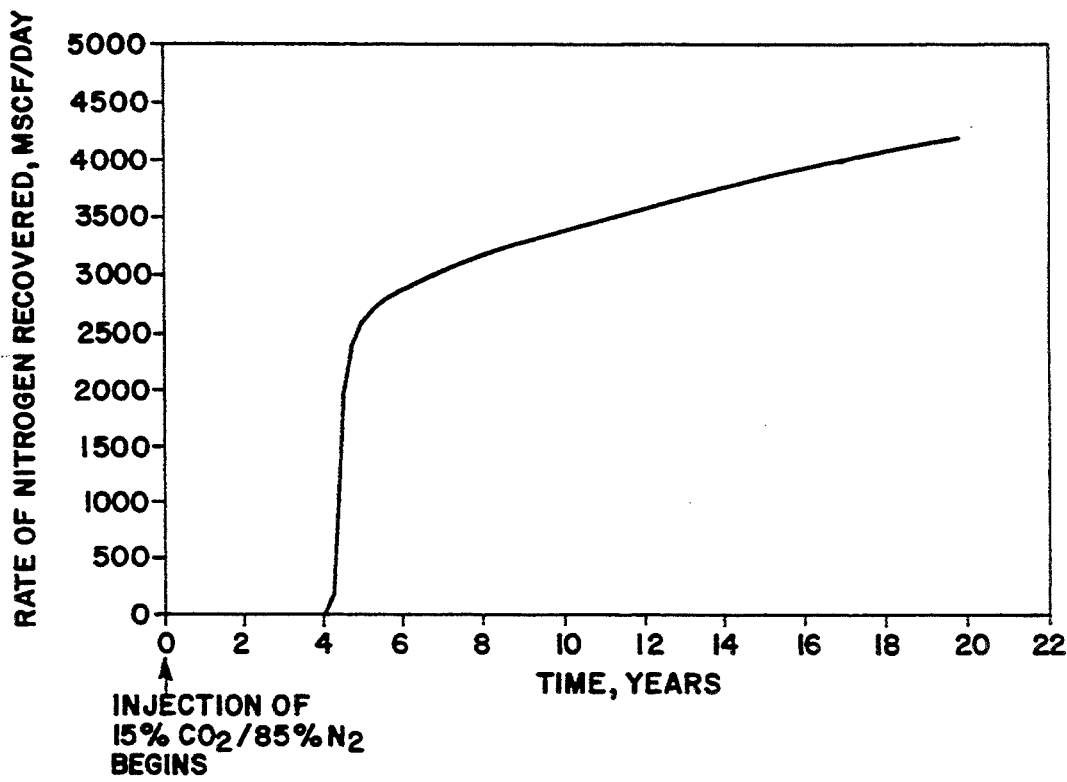
FIG. 10 is a graph of the recovery rate of nitrogen from the depleted coalbed of FIG. 8.
Figure 11:
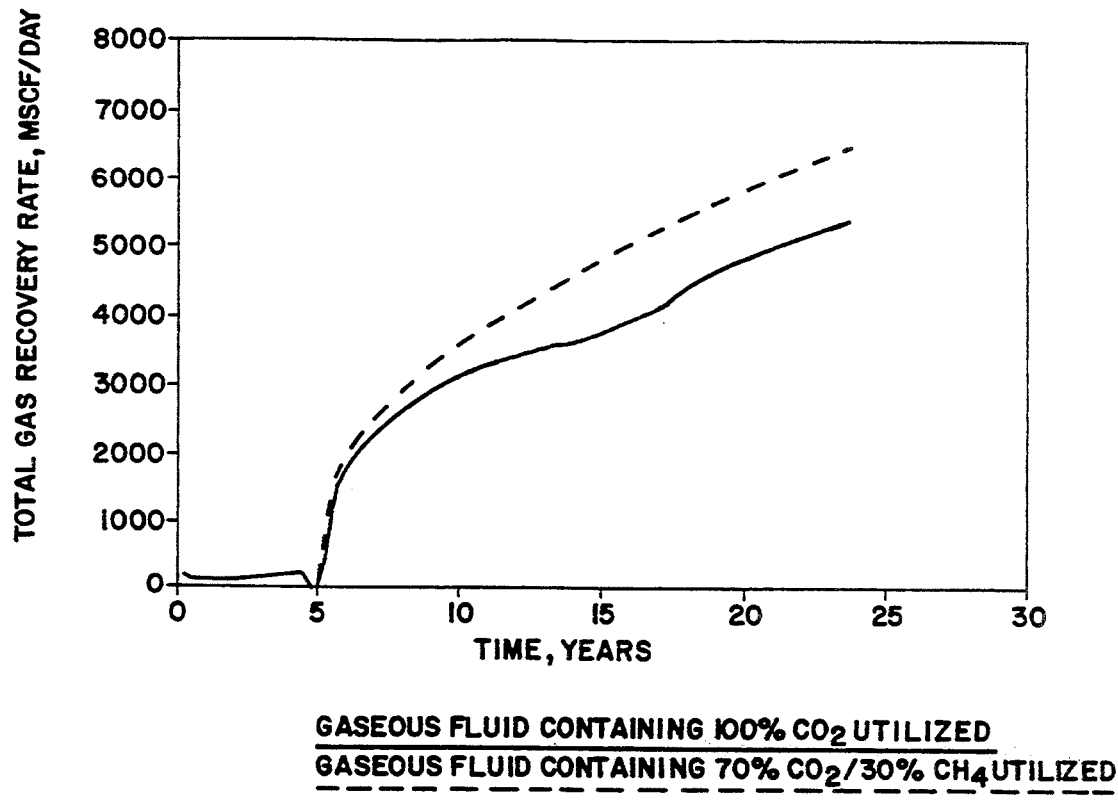
FIG. 11 is a graph of the total gas recovery rate over time from a fully methane-saturated coalbed. The graph compares the total gas recovery rate when pure carbon dioxide is injected into the bed to the recovery rate when a mixture containing 70 volume percent carbon dioxide and 30 volume percent methane is injected into the coalbed.
Figure 12:
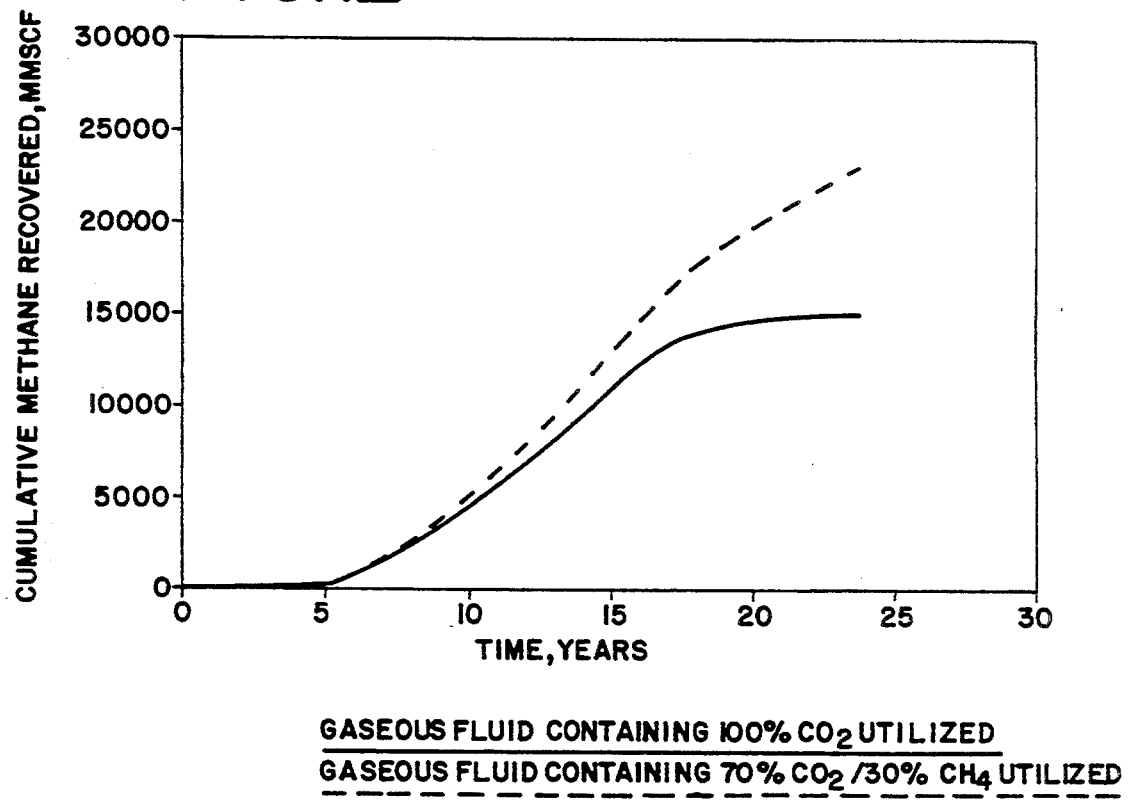
FIG. 12 is a graph of the cumulative volume of methane predicted to be recovered from the coalbed of FIG. 11.
Figure 13:
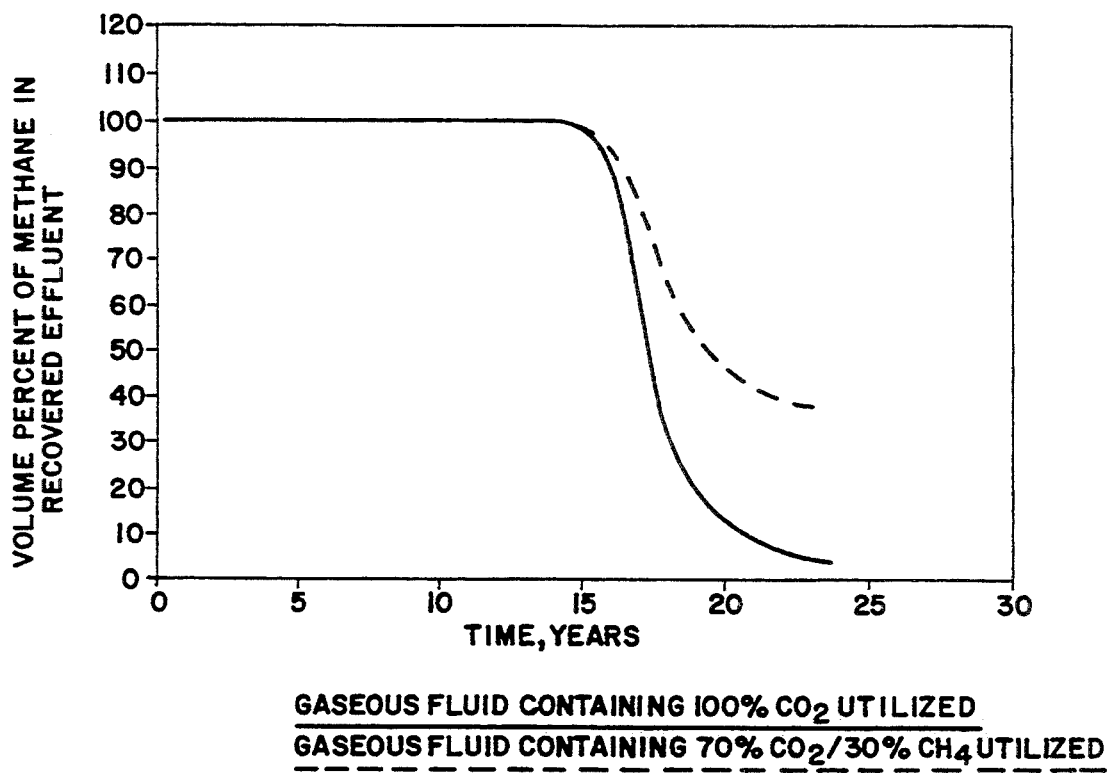
FIG. 13 is a graph of the volume percent of methane predicted to be present in the effluents recovered from the coalbed of FIG. 11.
Figure 14:
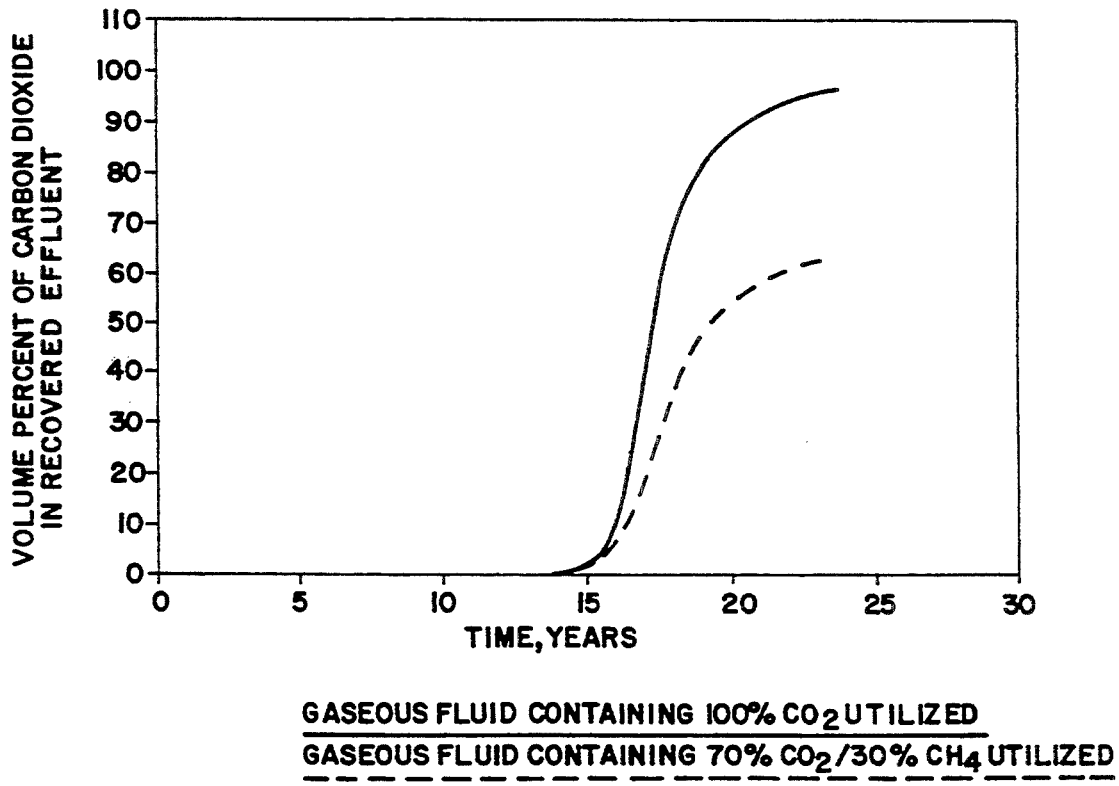
FIG. 14 is a graph of the volume percent of carbon dioxide predicted to be present in the effluents recovered from the coalbed of FIG. 11.
Figure 15:
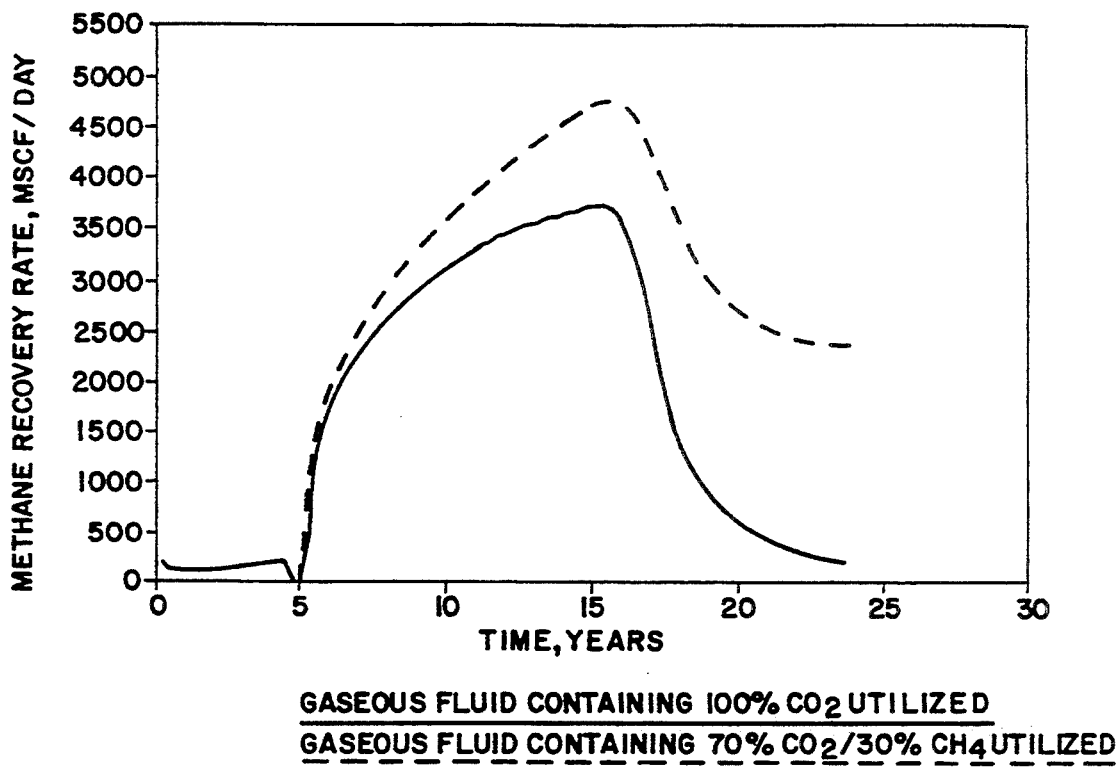
FIG. 15 is a graph of the predicted methane recovery rates for the coalbed of FIG. 11.
Figure 16:
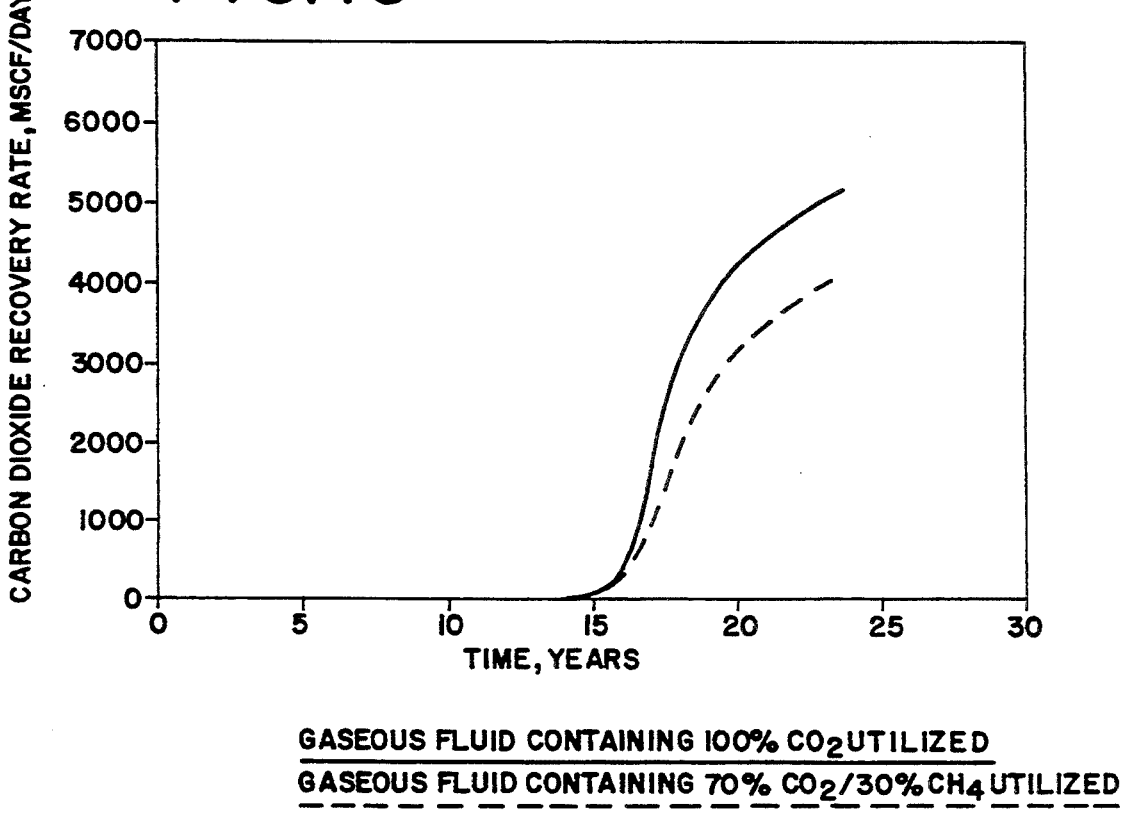
FIG. 16 is a graph of the predicted carbon dioxide recovery rates for the coalbed of FIG. 11.
Figure 17:
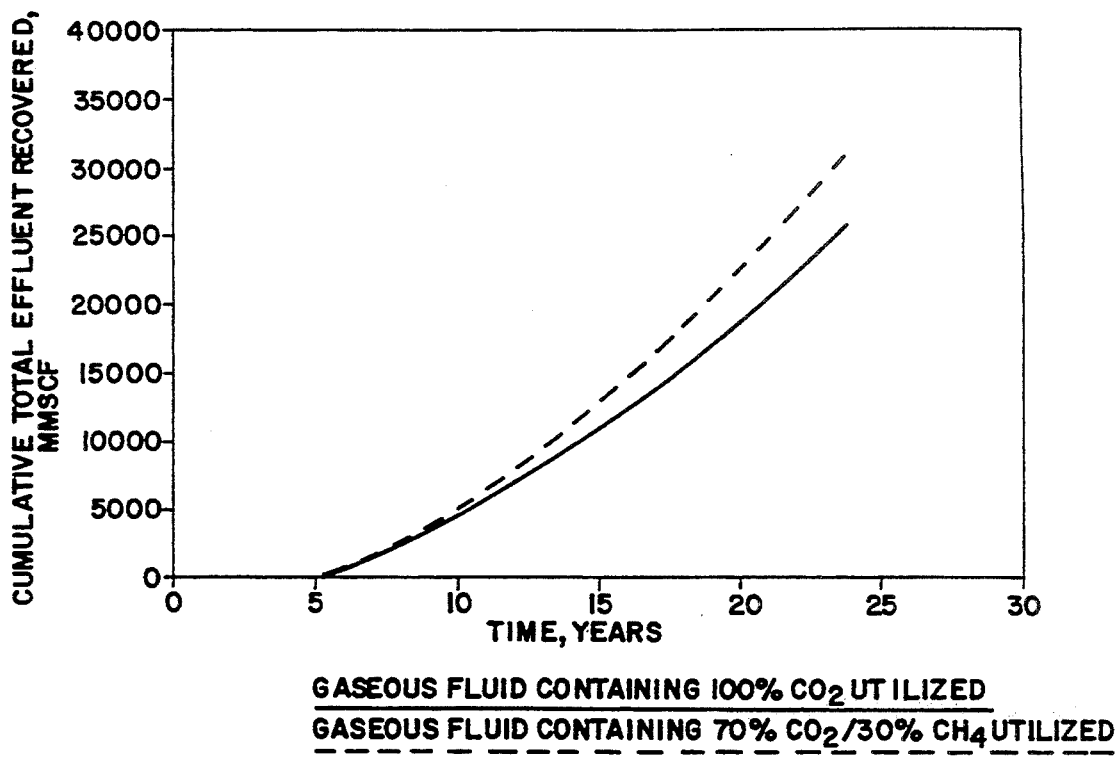
FIG. 17 is a graph of the predicted total gas production rates for coalbed of FIG. 11.
Figure 18:
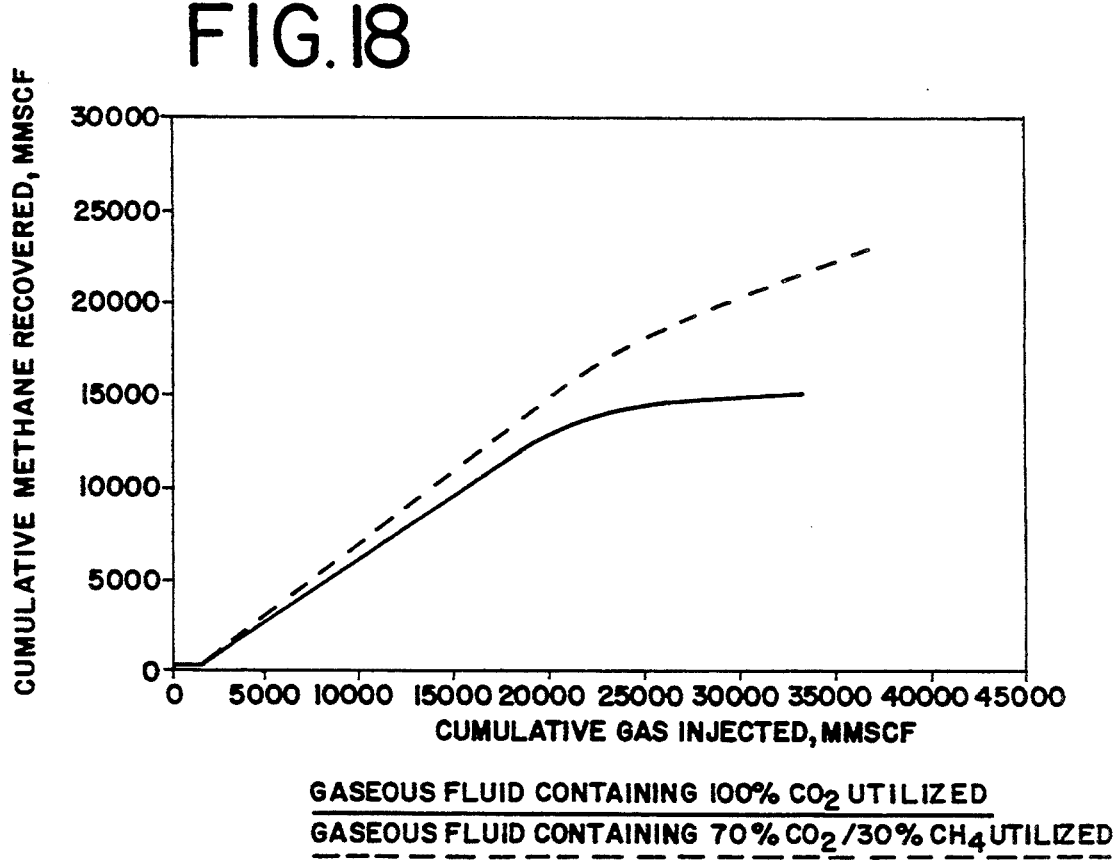
FIG. 18 is a graph of predicted cumulative methane recovered from the coalbed versus cumulative desorbing fluid injected for the coalbed of FIG. 11.

This example uses the same type of modeling techniques and parameters as utilized in Example 2. However, in this example an unsaturated coalbed is utilized and a mixture of gaseous fluids having 15 volume percent carbon dioxide and 85 volume percent nitrogen is injected into the coalbed. The injection of gaseous fluids was commenced at time zero. FIGS. 8–10 of the example show that a solid carbonaceous subterranean formation can effectively provide a nitrogen-enriched effluent when a mixture of gaseous fluids containing nitrogen and carbon dioxide is introduced into the formation. The model predicted that the volume percent of nitrogen in the recovered effluent would be 100% during the entire period graphed by FIGS. 8–10 that the volume percent of carbon dioxide in the effluent recovered would not increase to above 0.01% during the entire period graphed by FIGS. 8–10.

It is believed that a solid carbonaceous subterranean formation will also provide a nitrogen rich effluent when air is introduced into the formation through an injection well and removed through a production well.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made and materials may be substituted for those described in the application. For example, it is believed that a gaseous fluid which will chemisorb to the carbonaceous material of a formation may be disposed of in the formation in a similar method as disclosed for the disposal of a strongly adsorbing fluid within the formation.

Thus, it will be appreciated that various modifications, alternatives, variations, etc., may be made without departing from the spirit and scope of the invention as defined in the appended claims. It is, of course, intended that all such modifications are covered by the appended claims.

We claim:

1. A method for fractionating a mixture of gaseous fluids within a coal seam, the method comprising the steps of:
   a) introducing a mixture of gaseous fluids comprising methane and a stronger adsorbing fluid component into the coal seam: and
   b) recovering a raffinate, enriched in methane, from the coal seam.

2. The method of claim 1, wherein a total pressure is established on the coal seam during step b) and the method further comprises:
   c) lowering the total pressure on the coal seam to cause an adsorbate enriched in stronger adsorbing fluid components to desorb from the coal seam; and
   d) removing at least a portion of the desorbed adsorbate from the coal seam.

3. The method of claim 1, wherein the mixture of gaseous fluids introduced into the coal seam in step a) further comprises carbon dioxide.

4. The method of claim 1, wherein the mixture of gaseous fluids introduced into the coal seam in step a) is introduced into the coal seam through an injection well which penetrates the coal seam.

5. The method of claim 4, wherein the raffinate recovered in step b) is recovered through a production well which is in fluid communication with the coal seam.

6. The method of claim 5, wherein the production well penetrates the coal seam.

7. The method of claim 6, wherein the mixture of gaseous fluids introduced into the coal seam in step a) is introduced into the coal seam at a pressure below a parting pressure of the coal seam.

8. A method for recovering methane from a solid carbonaceous subterranean formation penetrated by an injection well and a production well, the method comprising the steps of:
   a) injecting a desorbing fluid comprising methane and carbon dioxide into the solid carbonaceous subterranean formation through the injection well, the desorbing fluid having a volume percentage of carbon dioxide equal to A;
   b) recovering an effluent comprising methane from the formation through the production well;
   c) monitoring the composition of the effluent produced in step b); and
   d) ceasing recovery of the effluent produced in step b) when a volume percentage of carbon dioxide in the effluent recovered in step b) is greater than 0.5 A.

9. The method of claim 8, further comprising:
   e) separating carbon dioxide from the effluent produced in step b); and
   f) reinjecting the carbon dioxide separated in step e) into a second solid carbonaceous subterranean formation.

10. The method of claim 8, wherein the solid carbonaceous subterranean formation comprises at least one coal seam.

11. The method of claim 8, wherein the volume percentage of carbon dioxide in the injected desorbing fluid is greater than forty nine percent.

12. A method for recovering methane from a solid carbonaceous subterranean formation penetrated by an injection well and a production well, the method comprising the steps of:
   a) injecting a desorbing fluid, having a volume ratio of carbon dioxide to other injected desorbing fluid components equal to B, into the solid carbonaceous subterranean formation through the injection well;
   b) recovering an effluent comprising injected desorbing fluid and methane from the production well;
   c) monitoring the volume ratio of the carbon dioxide to other injected desorbing fluid components contained in the effluent recovered at the production well; and
   d) ceasing recovery of the effluent from the production well when the volume ratio of carbon dioxide to other injected desorbing fluid components within the effluent recovered at the production well is greater than 0.5 B and at least 70 percent of the methane available to the production well has been recovered.

13. The method of claim 12, wherein the injected desorbing fluid comprises flue gas.

14. The method of claim 12, further comprising:
   e) restricting the flow of effluent from the production well when the volume ratio of carbon dioxide to other injected desorbing fluid components within the effluent recovered at the production well is greater than 0.5 B and less than 70 percent of the available methane to the production well has been recovered.

15. The method of claim 14, further comprising:
   f) recovering a second effluent comprising injected desorbing fluid and methane from the production well subsequent to step e) which has a post-restriction volume ratio of carbon dioxide to other injected desorbing fluid components less than the volume ratio of carbon dioxide to other injected desorbing fluid components within the effluent immediately prior to performing step e).

16. The method of claim 12, wherein the solid carbonaceous subterranean formation comprises at least one coal seam.

17. A method for disposing carbon dioxide within a solid carbonaceous subterranean formation, the method comprising the steps of:
   a) injecting a desorbing fluid, having a volume ratio of carbon dioxide to other injected desorbing fluid components equal to B, into the solid carbonaceous subterranean formation;
   b) withdrawing a gaseous effluent having a volume ratio of carbon dioxide to other desorbing fluids of less than B from the formation; and
   c) ceasing to withdraw the gaseous effluent from the formation when a volume ratio of carbon dioxide to other injected desorbing fluid components within the gaseous effluent withdrawn in step b) is greater than 0.5 B.

18. The method of claim 17, wherein the desorbing fluid withdrawn in step b) comprises carbon dioxide and the method further comprises:
   d) separating at least a portion of the carbon dioxide from the gaseous effluent produced in step b); and e) reinjecting at least a portion of the carbon dioxide separated in step d) into the solid carbonaceous subterranean formation.

19. The method of claim 17, the desorbing fluid injected into the formation in step a) is injected into the formation through an injection well which is in fluid communication with the solid carbonaceous subterranean formation.

20. The method of claim 19, wherein the desorbing fluid injected into the formation in step a) is injected into the formation at a pressure lower than a parting pressure of the formation.

21. The method of claim 19, wherein the gaseous effluent withdrawn in step b) is recovered from a production well in fluid communication with the solid carbonaceous subterranean formation.

22. The method of claim 17, wherein the gaseous effluent withdrawn in step b) comprises methane.

23. The method of claim 17, wherein the solid carbonaceous subterranean formation comprises at least one coal seam.

24. A method for recovering methane from a coal seam penetrated by an injection well and a production well, the method comprising the steps of:
   a) injecting a desorbing fluid, having a volume ratio of carbon dioxide to other injected desorbing fluid components equal to B, into the coal seam through the injection well;
   b) withdrawing a gaseous effluent comprising methane and carbon dioxide and having a volume ratio of carbon dioxide to other injected desorbing fluid components of less than B from the coal seam through the production well; and
   c) ceasing to withdraw the gaseous effluent from the coal seam when a volume ratio of carbon dioxide to other injected desorbing fluid components within the gaseous effluent withdrawn in step b) is greater than 0.5 B.

25. The method of claim 24, wherein the injected desorbing fluid comprises flue gas.

26. The method of claim 24, wherein the injected desorbing fluid contains greater than forty nine volume percent carbon dioxide.

27. The method of claim 24, wherein the injected desorbing fluid contains about 85 volume percent carbon dioxide.

* * * * *